United States Patent
Jiang et al.

(10) Patent No.: US 11,501,555 B2
(45) Date of Patent: Nov. 15, 2022

(54) UNDER-SCREEN BIOMETRIC IDENTIFICATION APPARATUS AND ELECTRONIC DEVICE

(71) Applicant: SHENZHEN GOODIX TECHNOLOGY CO., LTD., Shenzhen (CN)

(72) Inventors: Peng Jiang, Shenzhen (CN); Zhongbo Luo, Shenzhen (CN); Zhiming Hou, Shenzhen (CN); Jun Cai, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 329 days.

(21) Appl. No.: 16/851,846

(22) Filed: Apr. 17, 2020

(65) Prior Publication Data

US 2020/0242323 A1 Jul. 30, 2020

Related U.S. Application Data

(63) Continuation of application No. 16/563,854, filed on Sep. 7, 2019, now Pat. No. 10,691,917, which is a
(Continued)

(30) Foreign Application Priority Data

Jul. 6, 2018 (CN) .......................... 201821077979.2

(51) Int. Cl.
*G06V 40/13* (2022.01)
*H01L 27/32* (2006.01)
(Continued)

(52) U.S. Cl.
CPC .......... *G06V 40/1318* (2022.01); *G02B 7/04* (2013.01); *G02B 13/0025* (2013.01);
(Continued)

(58) Field of Classification Search
CPC .......... G06K 9/00; G06V 40/12–1394; G06V 10/147; G02B 7/04; G02B 13/0025;
(Continued)

(56) References Cited

U.S. PATENT DOCUMENTS 10,043,052 B2 * 8/2018 Wickboldt ......... G06V 40/1329
10,489,629 B1 * 11/2019 Jiang ................. G02B 13/0025
(Continued)

FOREIGN PATENT DOCUMENTS

| CA | 1124063 A | 5/1982 |
| CN | 2636263 Y | 8/2004 |

(Continued)

OTHER PUBLICATIONS

Bohong, X., "Research on image-based automatic focusing method and system implementation", [D]. National University of Defense Technology, Nov. 1, 2010, pp. 1-72, together with an English language abstract.
(Continued)

*Primary Examiner* — Sean T Motsinger
(74) *Attorney, Agent, or Firm* — Scully Scott Murphy & Presser

(57) ABSTRACT

Provided are an under-screen biometric identification apparatus and an electronic device. The under-screen biometric identification apparatus includes: a lens disposed under a display screen for receiving an optical signal formed by reflection of a human finger on the display screen, where the optical signal is used to detect biometric information of the finger; a lens barrel, where the lens is fixed in the lens barrel; and a support, where the support is connected to the lens barrel by means of threaded connection for supporting the lens barrel. An under-screen biometric identification apparatus and an electronic device provided in embodiments of
(Continued)

the present application can improve the efficiency of under-screen biometric identification.

19 Claims, 8 Drawing Sheets

Related U.S. Application Data continuation of application No. 16/104,205, filed on Aug. 17, 2018, now Pat. No. 10,489,629.

(51) Int. Cl.

| | | |
|---|---|---|
| *H04M 1/02* | (2006.01) | |
| *G02B 7/04* | (2021.01) | |
| *G02B 13/00* | (2006.01) | |
| *G06V 10/147* | (2022.01) | |
| *H01L 27/146* | (2006.01) | |
| *G06F 21/32* | (2013.01) | |
| *G06F 1/16* | (2006.01) | |
| *G06V 40/12* | (2022.01) | |

(52) U.S. Cl.
CPC ........ *G06V 10/147* (2022.01); *H01L 27/3234* (2013.01); *H04M 1/026* (2013.01); *G06F 1/1684* (2013.01); *G06F 21/32* (2013.01); *G06V 40/1359* (2022.01); *H01L 27/14678* (2013.01); *H04M 1/0266* (2013.01)

(58) Field of Classification Search
CPC .......... H01L 27/3234; H01L 27/14678; H04M 1/026; H04M 1/0266; G06F 1/1684; G06F 21/32

See application file for complete search history.

(56) References Cited

U.S. PATENT DOCUMENTS

| | | | | |
|---|---|---|---|---|
| 10,691,917 | B2* | 6/2020 | Jiang | G06V 10/147 |
| 2003/0089776 | A1* | 5/2003 | Hennick | G06K 7/1098 |
| | | | | 235/454 |
| 2004/0042088 | A1* | 3/2004 | Ito | G02B 7/025 |
| | | | | 359/819 |
| 2004/0179723 | A1* | 9/2004 | Sano | G06V 40/1312 |
| | | | | 382/124 |
| 2004/0252867 | A1 | 12/2004 | Lan | |
| 2005/0048692 | A1* | 3/2005 | Hanada | H01L 31/02325 |
| | | | | 257/E31.128 |
| 2005/0116138 | A1* | 6/2005 | Hanada | H01L 27/14683 |
| | | | | 250/206 |
| 2007/0109273 | A1* | 5/2007 | Orsley | G06F 1/1632 |
| | | | | 345/173 |
| 2008/0267463 | A1 | 10/2008 | Yuan | |
| 2008/0317293 | A1* | 12/2008 | Sakurai | G06V 40/13 |
| | | | | 382/115 |
| 2010/0117181 | A1* | 5/2010 | Kim | H01L 27/14632 |
| | | | | 257/E31.127 |
| 2010/0220900 | A1* | 9/2010 | Orsley | G06F 3/044 |
| | | | | 345/174 |
| 2011/0085072 | A1 | 4/2011 | Jung | |
| 2012/0069042 | A1* | 3/2012 | Ogita | H04M 1/0264 |
| | | | | 345/589 |
| 2013/0107353 | A1 | 5/2013 | Chen | |
| 2014/0133715 | A1* | 5/2014 | Ballard | G06F 3/0425 |
| | | | | 382/124 |
| 2014/0140587 | A1* | 5/2014 | Ballard | G06F 21/32 |
| | | | | 382/124 |
| 2016/0014308 | A1* | 1/2016 | Yamazaki | G06V 40/1312 |
| | | | | 348/77 |
| 2016/0034772 | A1* | 2/2016 | Betensky | G06V 40/1318 |
| | | | | 382/124 |
| 2016/0044215 | A1 | 2/2016 | Tsujikawa et al. | |
| 2017/0212613 | A1* | 7/2017 | Hwang | G06F 1/1626 |
| 2017/0220838 | A1* | 8/2017 | He | G06F 3/042 |
| 2017/0337412 | A1* | 11/2017 | Bhat | H04N 5/2256 |
| 2017/0351164 | A1* | 12/2017 | Kim | H04N 5/2257 |
| 2018/0059512 | A1* | 3/2018 | Rho | G03B 17/14 |
| 2018/0063420 | A1* | 3/2018 | Kang | H04N 5/345 |
| 2018/0121703 | A1 | 5/2018 | Jung et al. | |
| 2018/0129798 | A1* | 5/2018 | He | G06V 10/141 |
| 2018/0151641 | A1* | 5/2018 | Choo | H04M 1/0266 |
| 2018/0260602 | A1* | 9/2018 | He | A61B 5/14542 |
| 2020/0050822 | A1* | 2/2020 | Guo | G06V 40/1329 |

FOREIGN PATENT DOCUMENTS

| | | |
|---|---|---|
| CN | 102782574 A | 11/2012 |
| CN | 203340307 U | 12/2013 |
| CN | 104182727 A | 12/2014 |
| CN | 105072998 A | 11/2015 |
| CN | 105404879 A | 3/2016 |
| CN | 205318406 U | 6/2016 |
| CN | 106161897 A | 11/2016 |
| CN | 206102652 U | 4/2017 |
| CN | 106845436 A | 6/2017 |
| CN | 106895780 A | 6/2017 |
| CN | 206224518 U | 6/2017 |
| CN | 106940589 A | 7/2017 |
| CN | 106993117 A | 7/2017 |
| CN | 206312175 U | 7/2017 |
| CN | 107025399 A | 8/2017 |
| CN | 107092402 A | 8/2017 |
| CN | 107092820 A | 8/2017 |
| CN | 107193412 A | 9/2017 |
| CN | 107241468 A | 10/2017 |
| CN | 107305411 A | 10/2017 |
| CN | 206620186 U | 11/2017 |
| CN | 107423599 A | 12/2017 |
| CN | 107493420 A | 12/2017 |
| CN | 107526953 A | 12/2017 |
| CN | 206962938 U | 2/2018 |
| CN | 207039739 U | 2/2018 |
| CN | 107818296 A | 3/2018 |
| CN | 107957612 A | 4/2018 |
| CN | 207369168 U | 5/2018 |
| CN | 108323207 A | 7/2018 |
| CN | 208027382 U | 10/2018 |
| CN | 208044632 U | 11/2018 |
| JP | 2001510579 A | 7/2001 |
| JP | 2006121452 A | 5/2006 |
| JP | 2010541046 A | 12/2010 |
| JP | 2012070356 A | 4/2012 |
| JP | 2018515820 A | 6/2018 |
| KR | 20170106425 A | 9/2017 |
| KR | 20170136331 A | 12/2017 |
| WO | 2014162388 A1 | 10/2014 |

OTHER PUBLICATIONS

Uchida, K., "Fingerprint Identification", [J]. NEC Journal of Advanced Technology, Dec. 31, 2005, pp. 19-27, vol. 2, No. 1.

* cited by examiner

UNDER-SCREEN BIOMETRIC IDENTIFICATION APPARATUS AND ELECTRONIC DEVICE

CROSS-REFERENCE TO RELATED APPLICATIONS

This application is a continuation of U.S. patent application Ser. No. 16/563,854, filed on Sep. 7, 2019, which is a continuation of U.S. patent application Ser. No. 16/104,205, filed on Aug. 17, 2018. The U.S. patent application Ser. No. 16/104,205 claims priority of Chinese Patent Application No. 201821077979.2 entitled "UNDER-SCREEN BIOMETRIC IDENTIFICATION APPARATUS AND ELECTRONIC DEVICE" filed on Jul. 6, 2018 to Patent Office of the People's Republic of China, the entire content of which is incorporated herein by reference.

TECHNICAL FIELD

Embodiments of the present application relate to the field of biometric identification, and more particularly, to an under-screen biometric identification apparatus and an electronic device.

BACKGROUND

With rapid development of a mobile phone industry, biometric identification technology has received more and more attention from people, and practical usage of more convenient under-screen biometric identification apparatus, such as under-screen fingerprint identification technology, has become a popular requirement.

At present, under-screen optical fingerprint identification technology mainly includes under-screen optical fingerprint identification technology based on a periodic micro-hole array and under-screen optical fingerprint identification technology based on an integrated micro lens. The former optical fingerprint identification technology is susceptible to Moire fringes, and an optical fingerprint identification module needs to be attached under an OLED screen, while the process is complicated. A fingerprint identification module of the latter under-screen optical fingerprint identification technology is integrated, and therefore precision requirement of the entire optical fingerprint identification module is very high in a mass production process, whereas common processing technology is basically insufficient to meet actual needs. Due to the existence of the above various problems, the efficiency of under-screen biometric identification is affected.

Therefore, how to improve the efficiency of under-screen biometric identification has become a technical problem to be solved.

SUMMARY

Provided are an under-screen biometric identification apparatus and an electronic device, which could improve the efficiency of under-screen biometric identification.

In a first aspect, provided is an under-screen biometric identification apparatus, including a lens disposed under a display screen for receiving an optical signal formed by reflection of a human finger on the display screen, where the optical signal is used to detect biometric information of the finger; a lens barrel, where the lens is fixed in the lens barrel; and a support, where the support is connected to the lens barrel by means of threaded connection for supporting the lens barrel.

In some possible implementations, a dispensing structure is formed between the lens barrel and the support, and the threaded connection between the lens barrel and the support is fixed by means of dispensing in the dispensing structure.

In some possible implementations, the dispensing structure includes: a first step structure formed by an upper surface of the support extending downward in a peripheral area of a threaded hole.

In some possible implementations, the lens includes an aspherical lens or an aspherical lens group.

In some possible implementations, a lower surface of the support extends downward in a peripheral area of the threaded hole to form a first convex structure, and the lens is mounted in the first convex structure.

In some possible implementations, the lower surface of the support is provided with a second convex structure formed between the first convex structure and an edge of the support.

In some possible implementations, an upper surface of the lens barrel extends inward at a barrel opening to form a third convex structure, and the third convex structure is used for fixing the lens.

In some possible implementations, an upper surface of the lens barrel is provided with a bevel angle formed by chamfering processing at the barrel opening such that an inner diameter of the lens barrel at the upper surface is greater than an inner diameter of the lens barrel at the third convex structure.

In some possible implementations, an inner side surface of the lens barrel is provided with a second step structure formed under the third convex structure, and the lens is fixed in the lens barrel through the second step structure.

In some possible implementations, an outer side surface of the lens barrel is provided with a fourth convex structure formed under the third convex structure, and an external thread is formed on the fourth convex structure.

In some possible implementations, the under-screen biometric identification apparatus further includes an imaging chip disposed under the lens barrel for imaging based on an optical signal passing through the lens, where a distance between the lens and the imaging chip is adjusted by rotating the lens barrel.

In some possible implementations, a distance between an optical center of the lens and an upper surface of the imaging chip is equal to an imaging distance of the lens.

In some possible implementations, the upper surface of the lens barrel extends outward in an edge area to form at least one fifth convex structure, and the fifth convex structure is used for rotating the lens barrel to adjust a distance between the lens and the imaging chip.

In some possible implementations, the under-screen biometric identification apparatus further includes an optical filter, where the optical filter is located between the lens and the imaging chip.

In some possible implementations, the optical filter is fixed on the upper surface of the imaging chip.

In some possible implementations, the optical filter is fixed in the lens barrel.

In some possible implementations, an edge area of a lower surface of the lens extends downward to form a convex ring structure, a lower surface of the convex ring structure is in contact with the filter, and an outer side edge area of the convex ring structure is fixedly connected to an upper surface of the filter in an adhesive attaching and fixing method.

In some possible implementations, the under-screen biometric identification apparatus further includes a micro lens array fixed on an upper surface of the imaging chip, where the micro lens array is used for imaging an optical signal passing through the lens to imaging pixel units of the imaging chip.

In some possible implementations, each of the imaging pixel units of the imaging chip corresponds to one micro lens in the micro lens array.

In some possible implementations, the micro lens in the micro lens array is a hemispherical lens, the imaging pixel unit is a polygon, and a diameter of the hemispherical lens is a length of a long side of the polygon.

In some possible implementations, the under-screen biometric identification apparatus further includes a flexible printed circuit, where the imaging chip is fixed on an upper surface of the flexible printed circuit, and a lower surface of the support and the upper surface of the flexible printed circuit are fixedly connected in an edge area of the imaging chip.

In some possible implementations, the support is provided with a vent hole for adjusting an atmospheric pressure intensity of an internal space formed by the support and the flexible printed circuit.

In some possible implementations, the under-screen biometric identification apparatus further includes a steel plate, where the steel plate is fixed on a lower surface of the flexible printed circuit.

In some possible implementations, the under-screen biometric identification apparatus further includes a fixing support, where the support is fixed under the display screen by the fixing support such that a distance between the upper surface of the display screen and the optical center of the lens satisfies an imaging condition.

In some possible implementations, the under-screen biometric identification apparatus is applied to an electronic device, the fixing support is a middle frame of the electronic device, and the middle frame is used for supporting the display screen.

In some possible implementations, the middle frame and the support are fixed by any one of the following mounting methods: a screw mounting and fixing method, and an adhesive attaching and fixing method, a welding and fixing method and a coupling and fixing method.

In some possible implementations, the middle frame is provided with a hole, the lens barrel is at least partially accommodated in the hole, and there is a gap between an outer side of the lens barrel and an inner side of the hole.

In some possible implementations, an upper surface of the middle frame is provided with a bevel angle formed by chamfering processing at an edge of the hole, and the bevel angle enables a width of the hole on the upper surface of the middle frame to be larger than a width of the hole on the lower surface of the middle frame.

In some possible implementations, the upper surface of the middle frame is provided with a third step structure formed in an edge area of the hole.

In some possible implementations, a lower surface of the middle frame extends downward in a peripheral area of the hole to form a fifth convex structure, and the support is mounted in the fifth convex structure.

In some possible implementations, a lower surface of the middle frame extends upward in an edge area of the hole to form a groove structure, and the support is mounted in the groove structure.

In some possible implementations, the under-screen biometric identification apparatus further includes a foam, where the foam is disposed between an upper surface of the support and a lower surface of the middle frame.

In a second aspect, provided is an electronic device, including the under-screen biometric identification apparatus of the first aspect.

In some possible implementations, the electronic device further includes a display screen, where the under-screen biometric identification apparatus is disposed under the display screen such that a distance between an upper surface of the display screen and an optical center of a lens in the under-screen biometric identification apparatus satisfies an imaging condition.

On one hand, threaded connection between a support and a lens barrel in embodiments of the present application enables desired optical imaging to be achieved by focusing, in the process of assembling an under-screen biometric identification apparatus 140, thereby reducing requirements of processing technology, and also solving a problem of batch yield of an integrated module in a production assembly process and a problem that an optimal focal length of the integrated module cannot be precisely aligned, and further, improving the efficiency of under-screen biometric identification.

On the other hand, an optical fingerprint identification module is avoided to be attached to a lower surface of a display screen, and only the under-screen biometric identification apparatus 140 needs to be disposed under the display screen, for example, the lens is disposed on the display screen, thereby effectively simplifying an installation process of the under-screen biometric identification apparatus 140, improving a batch yield during the installation process of the under-screen biometric identification apparatus 140, and reducing a damage rate in a replacement process of the under-screen biometric identification apparatus 140, and further, reducing costs effectively.

DETAILED DESCRIPTION

The technical solutions in embodiments of the present application will be described hereinafter in conjunction with the attached drawings.

As a smart terminal enters an era of full screen, a biometric capturing area on the front of an electronic device is squeezed by the full screen, and therefore, an under-display or under-screen biometric identification technology has gained an increasing attention. The under-screen biometric identification technology refers to mounting an under-screen biometric identification apparatus (such as a fingerprint identification module) under a display screen, thereby realizing a biometric identification operation inside a display area of the display screen, without setting a biometric capturing area in an area on the front of an electronic device other than the display area.

The under-screen biometric identification technology may include an under-screen optical biometric identification technology, an under-screen ultrasonic biometric identification technology, or other types of under-screen biometric identification technologies.

Taking the under-screen optical biometric identification technology as an example, the under-screen optical biometric identification technology uses light returned from a top surface of a display component of a device for fingerprint sensing and other sensing operations. The returned light carries information of an object (e.g., a finger) in contact with the top surface, and a particular optical sensor module located under a display screen is implemented by capturing and detecting the returned light. The particular optical sensor module may be designed to achieve desired optical imaging by properly configuring an optical element for capturing and detecting a returned light.

It should be understood that technical solutions of embodiments of the present application can be applied to various electronic devices, and more particularly, to an electronic device having a display screen, for example, portable or mobile computing devices such as a smart phone, a notebook computer, a tablet computer and a game device, and other electronic devices such as an electronic database, an automobile and an automated teller machine (Automated Teller Machine, ATM), which is not limited in the embodiments of the present application.

It should also be understood that the technical solutions of the embodiments of the present application can perform other biometric identification in addition to fingerprint identification, for example, a living body identification and the like, which is not limited in the embodiments of the present application.

Figure 1:
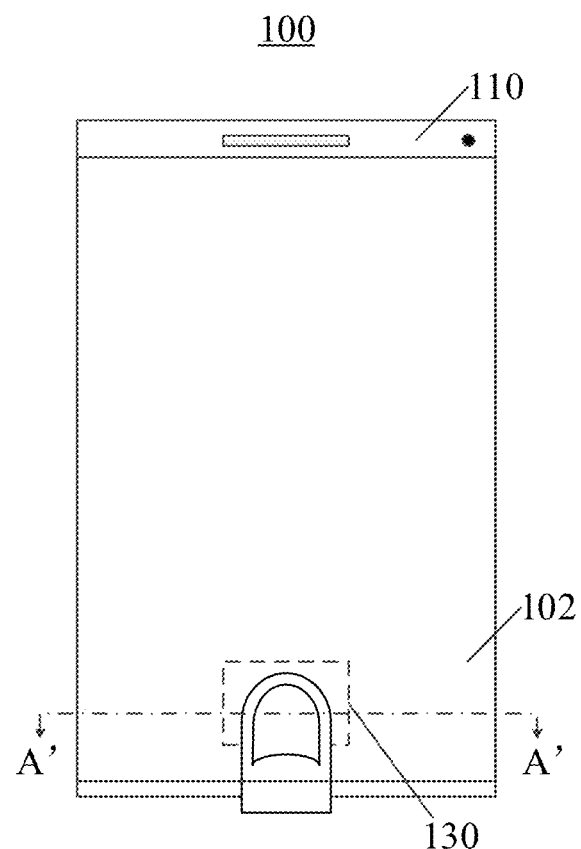
FIG. 1 is a schematic plan view of a mobile terminal to which the present application is applicable.
Figure 2:
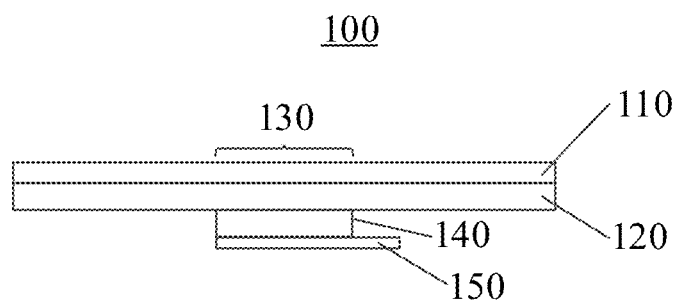
FIG. 2 is a partial schematic cross-sectional view of the mobile terminal shown in FIG. 1 taken along A'-A'.

FIG. 1 and FIG. 2 are schematic views showing an electronic device 100 to which an under-screen biometric identification apparatus is applicable. FIG. 1 is schematic front view of an electronic device 100 to which an under-screen biometric identification apparatus is applicable, and FIG. 2 is a partial schematic cross-sectional structural view of the electronic device 100 shown in FIG. 1 taken along A'-A'.

As shown in FIG. 1 and FIG. 2, the electronic device 100 may include a display screen 120 and an under-screen biometric identification apparatus 140; and the display screen 120 has a display area 102, and the under-screen biometric identification apparatus 140 is disposed under the display screen 120.

The display screen 120 may be a self-emitting display screen that employs a self-emitting display unit as a display pixel. For example, the display screen 120 may be an organic light-emitting diode (Organic Light-Emitting Diode, OLED) display screen or a micro light-emitting diode (micro-LED) display screen. In other alternative embodiments, the display screen 120 may also be a liquid crystal display (Liquid Crystal Display, LCD) screen or other passive light-emitting display screens, which is not limited in the embodiments of the present application.

The display screen 120 may be specifically a touch display screen, which may not only display a screen but also detect a touch or press operation of a user, thereby providing the user with a human-machine interaction interface. For example, in an embodiment, the electronic device 100 may include a touch sensor, and the touch sensor may be specifically a touch panel (Touch Panel, TP), which may be disposed on a surface of the display screen 120, or may be partially integrated or entirely integrated into an interior of the display screen 120 to form a touch display screen.

The under-screen biometric identification apparatus 140 may be an optical under-screen biometric identification apparatus, which may include an optical biometric sensor with an optical sensing array, such as an optical fingerprint sensor; and the optical sensing array includes a plurality of optical sensing units, and an area where the optical sensing array is located is a biometric capturing area of the under-screen biometric identification apparatus 140, and the optical sensing units are used for capturing fingerprint characteristic information (such as fingerprint image information) of a user.

The under-screen biometric identification apparatus 140 may be disposed at least in a partial area under the display screen 120 such that the biometric capturing area (or sensing area) of the under-screen biometric identification apparatus 140 is at least partially located in the display area 102 of the display screen 120.

As shown in FIG. 1, the biometric capturing area 130 is located in the display area 102 of the display screen 120. Therefore, when a user needs to unlock the electronic device or perform other biometric verification, a biometric input operation can be implemented merely by pressing a finger on the biometric capturing area 130 located on the display screen 120. Since biometric capturing detection can be implemented inside the display area 102 of the display screen 120, a front surface of the electronic device 100 in the above structure does not need to reserve space to set a fingerprint button (such as a Home button), so that a full screen solution can be adopted. That is, the display area 102 of the display screen 120 can be substantially extended to the entire front surface of the electronic device 100.

In the biometric identification process, the display screen 120 adopting the OLED display screen is taken as an example, the display screen 120 has OLED display units distributed in an array, and the under-screen biometric identification apparatus 140 can utilize an OLED display unit (i.e., an OLED light source) of the OLED display 120 located in the biometric capturing area 130 as an excitation light source for biometric detection and identification. Of course, it should be understood that in other alternative implementations, the under-screen biometric identification apparatus 140 may also provide an optical signal for biometric detection and identification by adopting an internal light source or an external light source; and in this case, the under-screen biometric identification apparatus can be applied not only to a self-emitting display screen such as an OLED display screen, but also to a non-self-emitting display screen such as a liquid crystal display screen or other passive light-emitting display screens. Moreover, the optical sensing array of the under-screen biometric identification apparatus 140 may be specifically a photo detector array (or referred to as a photodetector array) including a plurality of photo detectors or photodetectors distributed in an array, and the photo detectors or photodetectors may server as the optical sensing units as described above.

When a finger touches, presses, or approaches (collectively referred to as pressing for convenience of description) the biometric acquiring area 130, light emitted by the display unit of the biometric capturing area 130 is reflected by the finger to form reflected light. The reflected light may carry fingerprint characteristic information of a user's finger. For example, after the light is reflected by a fingerprint on the surface of the user's finger, since the reflected light of a fingerprint ridge is different from that of a fingerprint valley, the reflected light carries fingerprint information of the user. The reflected light is returned to the display screen 120, received by a photodetector array of the under-screen biometric identification apparatus 140 underneath, and converted into a corresponding electrical signal, i.e., a biometric detection signal. The electronic device 100 can obtain biometric information of the user based on the biometric detection signal, and can further perform biometric matching verification, thereby completing identity verification of the current user so as to confirm whether the user has permission to perform a corresponding operation on the electronic device 100.

In other alternative embodiments, the under-screen biometric identification apparatus 140 may also be disposed in an entire area under the display screen 120 so as to extend the biometric capturing area 130 to the entire display area 102 of the display screen 120, thereby implementing full screen biometric identification.

It should be understood that in a specific implementation, the electronic device 100 may further include a protective cover 110, the protective cover 110 may be specifically a transparent cover such as a glass cover or a sapphire cover which is located on the display screen 120 and covers a front surface of the electronic device 100, and the surface of the protective cover 110 may also be provided with a protective layer. Therefore, in an embodiment of the present application, the so-called finger pressing the display screen 120 may actually refer to the finger pressing the cover plate 110 on the display screen 120 or covering a surface of the protective layer of the cover 110.

In one implementation, the under-screen biometric identification apparatus 140 may transmit light to a sensing array by using a periodic micro-hole array. This requires an optical fingerprint identification module to be bonded under an OLED screen, which is complicated and costly. In another implementation, the under-screen biometric device 140 may transmit light to a sensing array by using an integrated micro lens, which refers to designing the micro lens and the sensing array as a whole so as to further form an integrated module. Since the integrated module has very high precision requirements in a mass production process, a common processing technology is substantially insufficient to meet actual needs.

In order to solve the above technical problem, embodiments of the present application provide an improved technical solution. Specifically, the under-screen biometric identification apparatus 140 adopts a lens to transmit light onto a sensing array. More specifically, the under-screen biometric identification apparatus 140 may include a support and a lens barrel having a built-in lens, where the lens is disposed under a display screen for receiving an optical signal formed by reflection of a human finger on the display screen, and the optical signal is used to detect biometric information of the finger. For example, the optical signal may be reflected light carrying fingerprint information of the finger as described above, and may be used to detect the fingerprint information of the finger. The support is connected to the lens barrel by means of threaded connection for supporting the lens barrel.

It should be noted that, in certain scenarios, the lens in the embodiment of the present application needs to be configured as an element or a device for modulating light that is more accurate in an assembling process and smaller in volume than a front camera for photographing, so as to meet precise focusing requirements of an under-screen optical fingerprint.

Compared with the former implementation manner (using a periodic micro-hole array to transmit light onto a sensing array), the technical solution of the embodiment of the present application avoids bonding an optical fingerprint identification module to a lower surface of a display screen, and only requires to dispose an under-screen biometric identification apparatus 140 under the display screen. For example, the lens is disposed under the display screen, which effectively simplifies a mounting process of the under-screen biometric identification apparatus 140, improves a batch yield in the process of mounting the under-screen biometric identification apparatus 140, reduces a damage rate in a replacement process of the under-screen biometric identification apparatus 140, and further, reduces the cost effectively.

Compared with the latter implementation manner (using an integrated micro lens to transmit light onto a sensing array), threaded connection between a support and a lens barrel in the technical solution of the embodiment of the present application enables desired optical imaging to be achieved by focusing in a process of assembling the under-screen biometric identification apparatus 140, thereby reducing requirements of a processing technology, effectively solving a problem of high precision requirements in a mass production process of an integrated module, and also solving a problem of a batch yield of an integrated module in a production assembly process and a problem that an optimal focal length of the integrated module cannot be precisely aligned, and further, improving the efficiency of under-screen biometric identification.

An under-screen biometric identification apparatus 300 according to an embodiment of the present application will be clearly described below with reference to FIGS. 3 to 5. It should be noted that, in the embodiments of the present application, like reference numerals represent like components, and detailed description of the like components is omitted in different embodiments for the sake of brevity.

Figure 3:
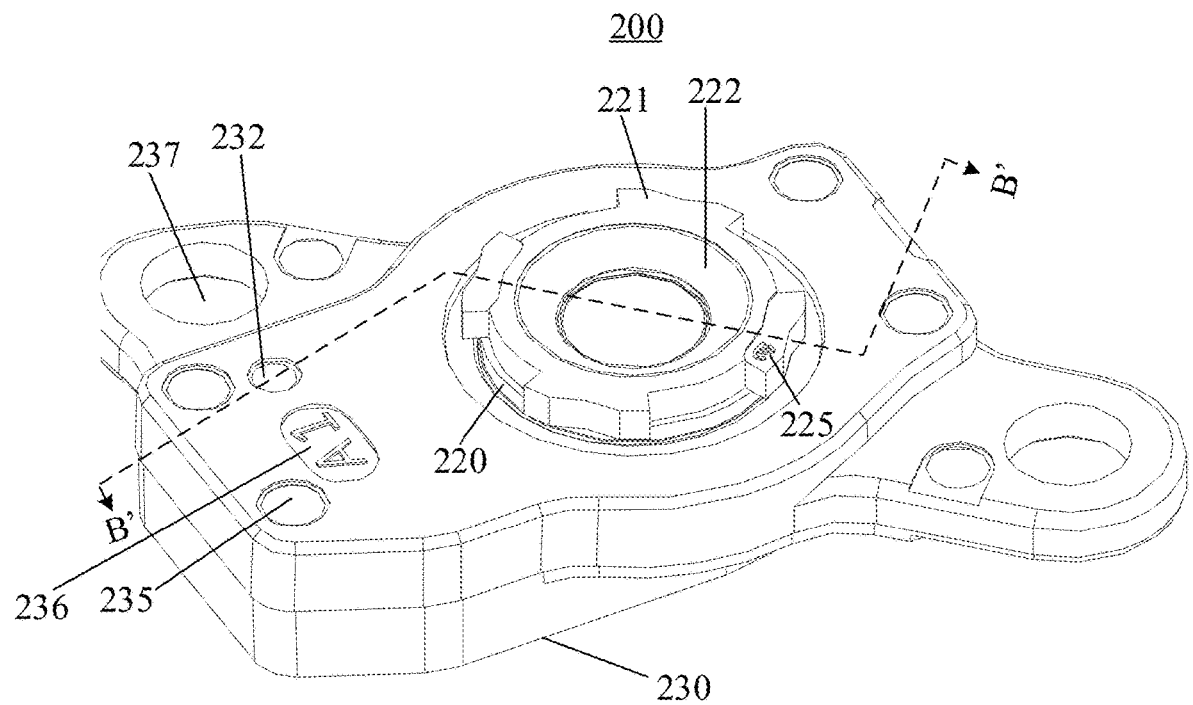
FIG. 3 is an oriented view of an under-screen biometric identification apparatus.
Figure 4:
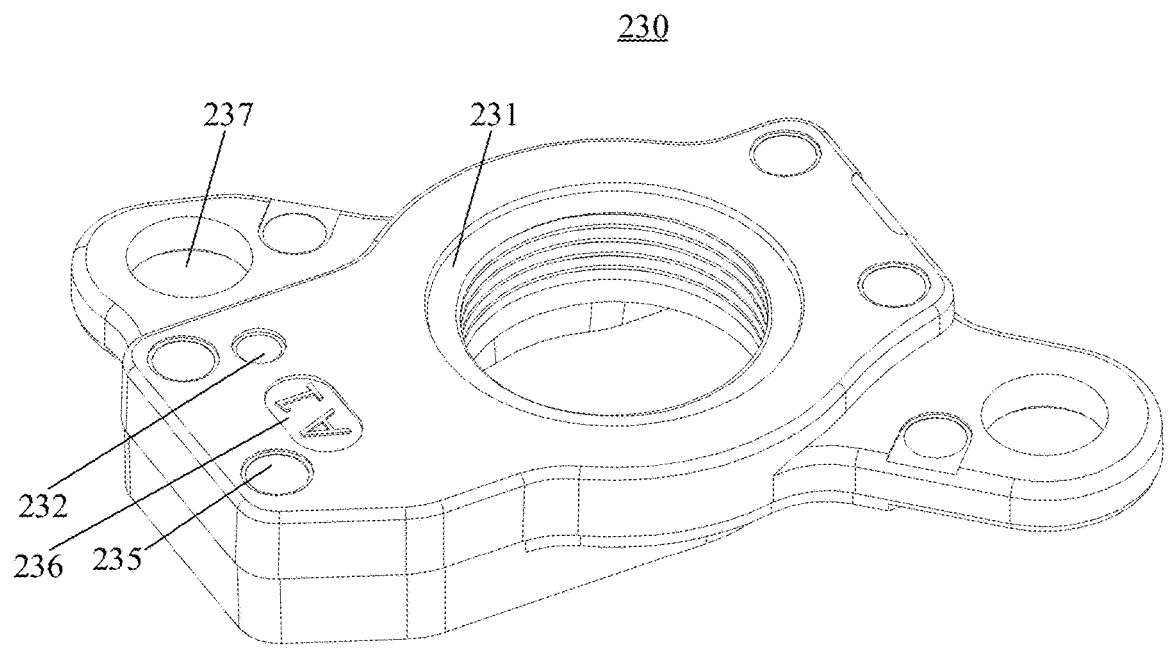
FIG. 4 is an oriented view of a support in the under-screen biometric identification apparatus shown in FIG. 3.
Figure 5:
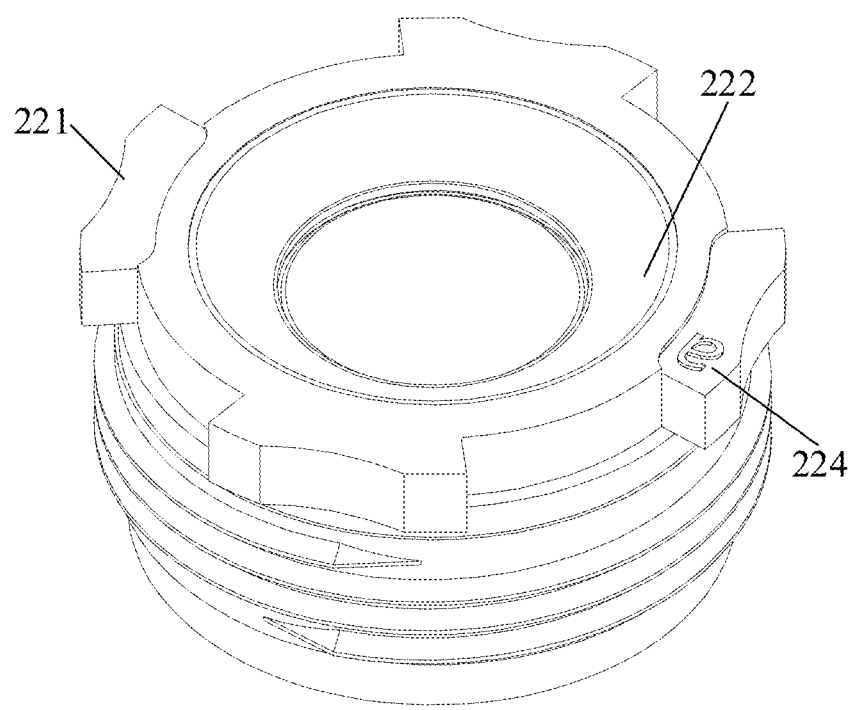
FIG. 5 is an oriented view of a lens barrel in the under-screen biometric identification apparatus shown in FIG. 3.
Figure 6:
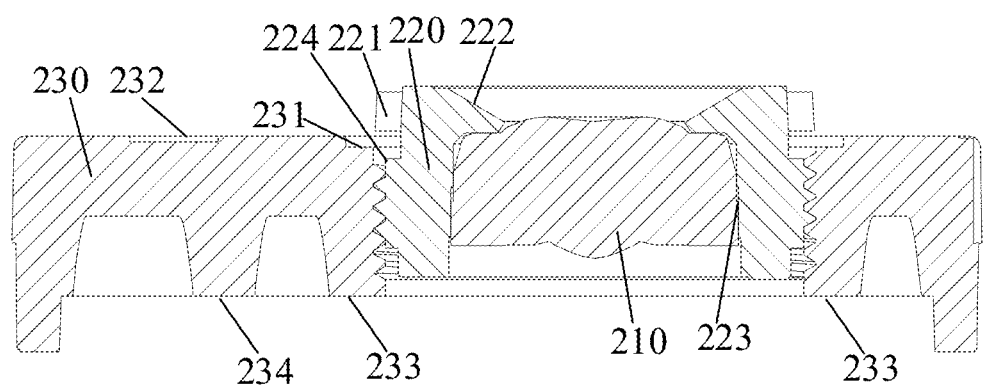
FIG. 6 is a partial schematic cross-sectional structural view of the under-screen biometric identification apparatus shown in FIG. 3 taken along B'-B'.

FIGS. 3 to 13 show schematic views of an under-screen biometric identification apparatus 200, where FIG. 3 is an oriented view of an under-screen biometric identification apparatus 200. FIG. 4 is an oriented view of a support 230 in the under-screen biometric identification apparatus 200 shown in FIG. 3. FIG. 5 is an oriented view of a lens barrel 230 in the under-screen biometric identification apparatus 200 shown in FIG. 3. FIG. 6 is a partial schematic cross-sectional structural view of the under-screen biometric identification apparatus 200 shown in FIG. 3 taken along B'-B'.

As shown in FIGS. 3 to 6, the under-screen biometric identification apparatus 200 may include a lens 210, a lens barrel 220 and a support 230. The lens 210 is disposed under a display screen, and is used for receiving an optical signal formed by reflection of a human finger on the display screen. For example, after light emitted by the display screen is reflected by a finger on the display screen, a portion of reflected light may be received by the lens 210. The lens 210 is fixed in the lens barrel 220. The support 230 is connected to the lens barrel 220 by means of threaded connection for supporting the lens barrel 220.

The display screen may be the display screen shown in FIG. 1 and FIG. 2. For related description, reference may be made to the foregoing description of the display screen 120, and no further details are provided herein for brevity.

Optionally, in an embodiment of the present application, the lens 210 may include an aspherical lens or an aspherical lens group to reduce imaging distortion of a fingerprint image.

It should be noted that a focal length of the aspherical lens or the aspherical lens group may be smaller than a focal length of a front camera for photographing, or the lens 210 is a macro lens to meet requirements of under-screen fingerprint identification. For example, a focal length of the macro lens may range from 0.5 mm to 1.8 mm. It should be noted that the range is only an exemplary range of the gap, and the embodiment of the present application is not limited thereto. For example, the focal length of the macro lens may also be 2 mm.

In the process of assembling the under-screen biometric identification apparatus 200, desired optical imaging can be achieved by an auto-focusing machine adjusting a height of the lens barrel 220.

In order to ensure that the height-adjusted lens barrel 220 can be stably fixed on the support 230, optionally, in an embodiment of the present application, a dispensing structure may be formed between the lens barrel 220 and the support 230, and threaded connection between the lens barrel 220 and the support 230 is fixed by means of dispensing in the dispensing structure. For example, as shown in FIGS. 3 to 6, the dispensing structure may include a first step structure 231 formed by an upper surface of the support 230 extending downward in a peripheral area of a threaded hole, which may provide an accommodation space for glue. Therefore, the lens barrel 220 and the support 230 can be fixedly connected by means of dispensing in the accommodation space provided by the first step structure 231.

It should be understood that the first step structure 231 may include one or more steps. This is not limited by the embodiment of the present application. For example, as shown in FIGS. 3 to 6, the first step structure 231 includes two steps.

It should also be understood that the first step structure 231 may be continuous or discrete along the threaded hole of the upper surface of the support 230. This is not limited by the embodiment of the present application. For example, as shown in FIGS. 3 to 6, the first step structure 231 presents a concave ring along the threaded bore of the upper surface of the support 230.

Optionally, in an embodiment of the present application, a lower surface of the support 230 may be thickened in a peripheral area of the threaded hole to increase reliability of the threaded connection between the support 230 and the lens barrel 220. For example, as shown in FIGS. 3 to 6, a lower surface of the support 230 extends downward in a peripheral area of the threaded hole to form a first convex structure 233, and the lens 210 is mounted in the first convex structure 233. Specifically, the first convex structure 233 may be continuous or discrete along the threaded hole of the lower surface of the support 230, which is not specifically limited in the embodiment of the present application.

Optionally, in an embodiment of the present application, a thinner portion of the support 230 may also be thickened to enhance the strength of the support 230. For example, as shown in FIGS. 3 to 6, the lower surface of the support 230 is provided with a second convex structure 234 formed between the first convex structure 233 and an edge of the support 230. Specifically, the second convex structure 234 may be continuous or discrete in a certain direction, which is not limited in the embodiment of the present application.

In order to ensure that the lens 210 is stably fixed in the lens barrel 220, optionally, in an embodiment of the present application, a structure for preventing the lens 210 from moving upward may be provided at a barrel opening on the upper surface of the lens barrel 220. For example, as shown in FIGS. 3 to 6, an upper surface of the lens barrel 220 extends inward at a barrel opening to form a third convex structure, and the third convex structure 222 is used for fixing the lens 210. Optionally, in another embodiment of the present application, in order to prevent the lens 210 from moving downward, an inner side surface of the lens barrel 220 and the lens 210 may be fixed by an adhesive attaching and fixing method.

Optionally, in an embodiment of the present application, the upper surface of the third convex structure 222 may be designed as a specific structure, such as a funnel structure or a bevel structure, so that an optical signal reflected by a human finger from a display screen passes through the third convex structure 222 as much as possible, thereby increasing the amount of signals received by the lens 210. For example, as shown in FIGS. 3 to 6, an upper surface of the lens barrel 220 is provided with a bevel angle formed by chamfering processing at the barrel opening such that an inner diameter of the lens barrel 220 at the upper surface is greater than an inner diameter of the lens barrel 220 at the third convex structure 222.

Optionally, in an embodiment of the present application, an additional space for accommodating glue may be provided between an inner side surface of the lens barrel 220 and the lens to increase reliability of attaching between the inner side surface of the lens barrel 220 and the lens 210. For example, as shown in FIGS. 3 to 6, an inner side surface of the lens barrel 220 is provided with a second step structure 223 formed under the third convex structure 222, and the lens 210 is fixed in the lens barrel 220 through the second step structure 223. Specifically, the second step structure 223 could increase the accommodation space of the glue to the largest extent.

Optionally, in an embodiment of the present application, a barrel wall of the lens barrel 220 may be further thickened to enhance the strength of a barrel body of the lens barrel 220. For example, as shown in FIGS. 3 to 6, an outer side surface of the lens barrel 220 is provided with a fourth convex structure 224 formed under the third convex structure 222, and an external thread is formed on the fourth convex structure 224. With this design structure, not only the strength of the barrel body of the lens barrel 220 could be increased, but also the accommodation space of the glue could be further increased, and the lens barrel 220 could be more stably fixed on the support 230.

Optionally, in an embodiment of the present application, an upper surface of the lens barrel 220 may be provided with a structure for an autofocus machine to perform a focusing operation. For example, the upper surface of the lens barrel 220 extends outward in an edge area to form at least one fifth convex structure 221, and the fifth convex structure 221 is used for rotating the lens barrel 220 to adjust a distance between the lens 210 and an imaging chip 250. It should be understood that the fifth convex structure 221 may be continuous or discrete in a certain direction, which is not limited in the embodiment of the present application. For example, as shown in FIGS. 3 to 6, at least one fifth convex structure 221 is four protruding petals.

It should be understood that the lens 210, the lens barrel 220, and the support 230 may be designed with other structures in a specific implementation. For example, as shown in FIGS. 3 to 6, the lens 210 may also be designed with a size mark (a) 225 of the lens 210. The lens barrel 220 may also be designed with a size mark (A1) 236 of the lens barrel 220 and a counterbore 235 for mounting. For example, as shown in FIGS. 3 to 6, a different manufacturer of the counterbore can use a different aperture and bore depth. For another example, as shown in FIG. 3 and FIG. 4, the support 230 may also be designed with a hole 237 for fixing the support 230, such as a threaded fixing hole.

Figure 7:
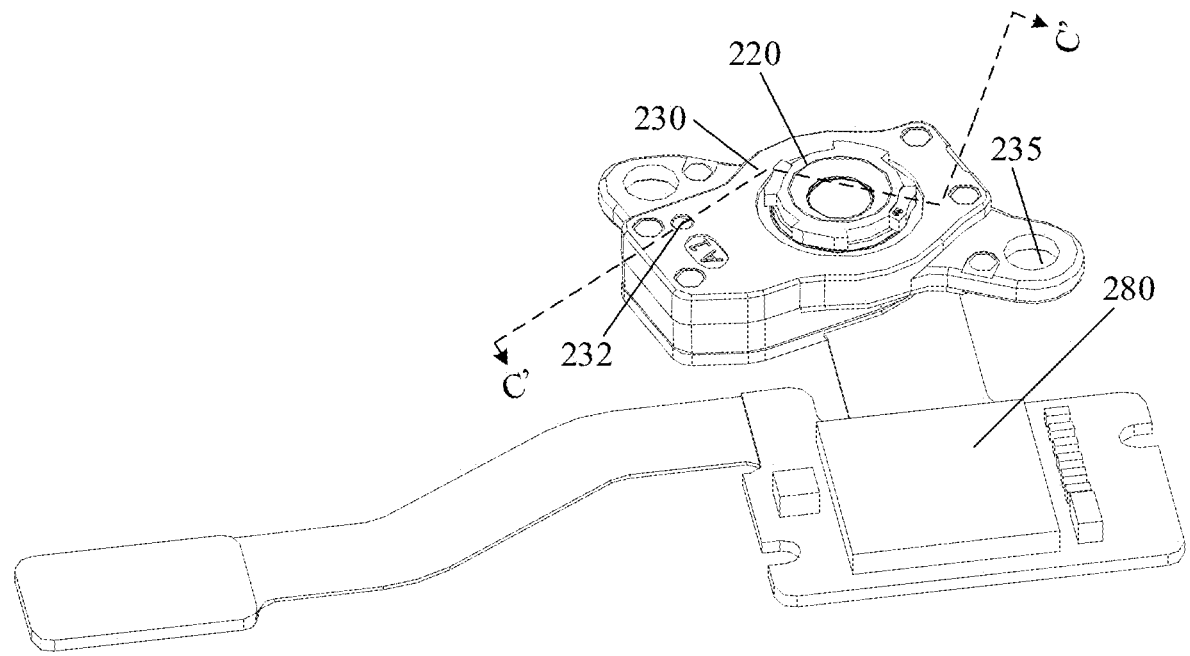
FIG. 7 is an oriented view of an under-screen biometric identification apparatus according to an embodiment of the present application.
Figure 8:
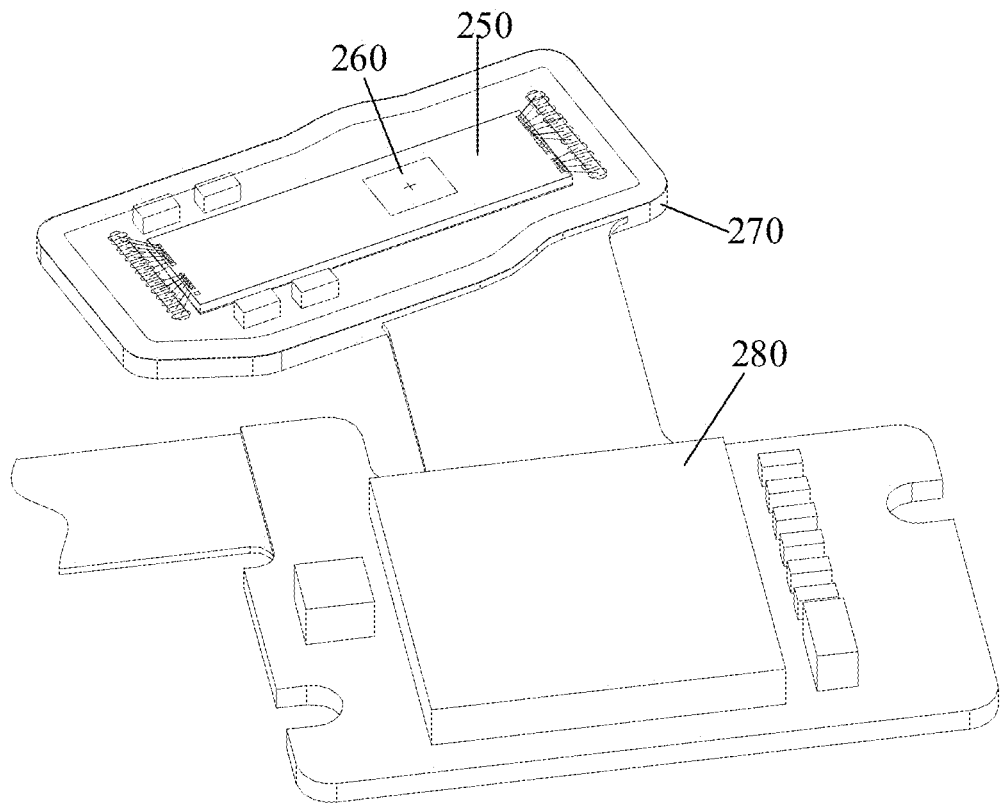
FIG. 8 is an oriented view of a filter, an imaging chip, a circuit board, and an image processor in the under-screen biometric identification apparatus shown in FIG. 7.
Figure 9:
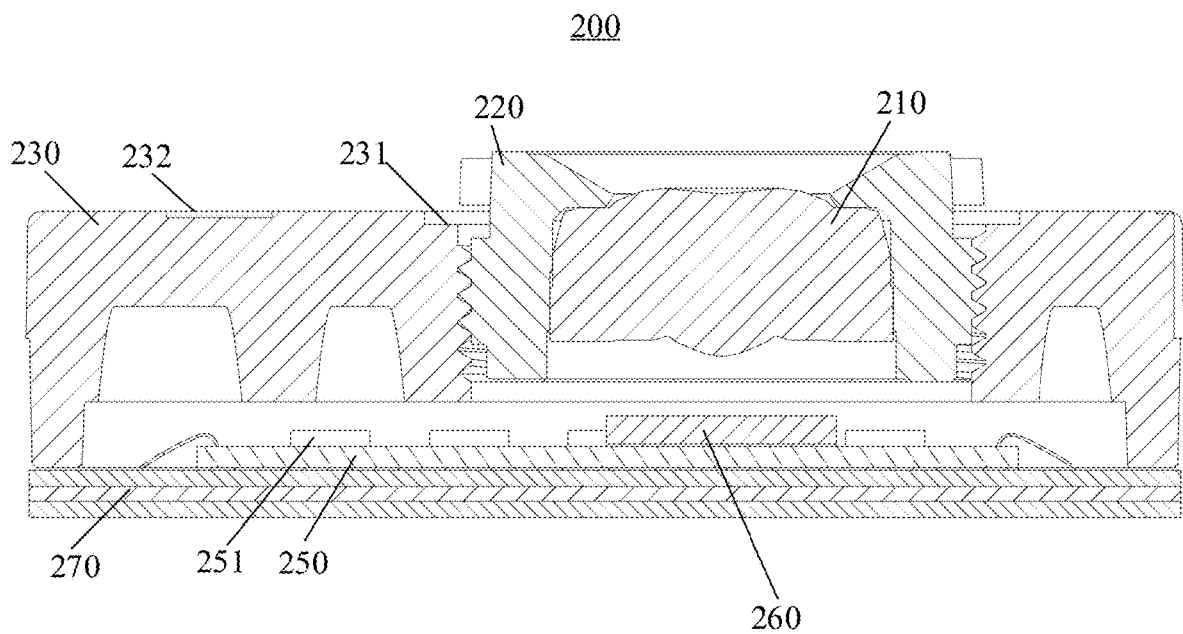
FIG. 9 is a partial schematic cross-sectional structural view of the under-screen biometric identification apparatus shown in FIG. 7 taken along C'-C'.

FIGS. 7 to 9 are schematic views of an under-screen biometric identification apparatus 200 according to embodiments of the present application. FIG. 7 is an oriented view of an under-screen biometric identification apparatus 200 integrated with a filter, an imaging chip 250, a circuit board, and an image processor 280. FIG. 8 is an oriented view of the filter 260, the imaging chip 250, the circuit board, and the image processor 280 in the under-screen biometric identification apparatus 200 shown in FIG. 7. FIG. 9 is a partial schematic cross-sectional structural view of the under-screen biometric identification apparatus 200 shown in FIG. 7 taken along C'-C'.

In embodiments of the present application, an optical signal formed by reflection of a human finger on a display screen may be used for imaging of a fingerprint image after modulation of the lens 210.

Optionally, in an embodiment of the present application, as shown in FIGS. 7 to 9, the under-screen biometric identification apparatus 200 may further include an imaging chip 250 disposed under the lens barrel 220 for imaging based on an optical signal passing through the lens 210, where a distance between the lens 210 and the imaging chip 250 is adjusted by rotating the lens barrel 220. In other words, the distance between the lens 210 and the imaging chip 250 can be adjusted by adjusting the height of the lens barrel 220.

Optionally, in an embodiment of the present application, a distance between an optical center of the lens 210 and an upper surface of the imaging chip 250 is equal to an imaging distance of the lens 210. Specifically, in the process of assembling the under-screen biometric identification apparatus 200, adjustment of the distance between the lens 210 and the imaging chip 250 can be achieved by an auto-focusing machine adjusting a height of the lens barrel 220, so as to achieve desired imaging of a fingerprint image.

Optionally, the imaging distance of the lens 210 may be greater than a focal length of the lens 210.

It should be understood that the distance between the lens 210 and the imaging chip 250 may be the distance between the optical center of the lens 210 and the upper surface of the imaging chip 250, and the optical center of the lens 210 is a special point in the lens 210, where a propagation direction of light does not change as long as the light passes through the special point. The optical center of the lens 210 is also referred to as an optic center of the lens 210.

In the embodiments of the present application, the imaging chip 250 receives the optical signal modulated by the lens 210 and acquires a biometric detection signal (such as a fingerprint image) based on the received optical signal, and the biometric detection signal is used for fingerprint recognition. In other words, the imaging chip 250 first receives the optical signal modulated by the lens 210 and performs imaging based on the received optical signal to generate a fingerprint image; then, the fingerprint image is transmitted to an image processor so that the image processor performs image processing to obtain a fingerprint signal; and finally, fingerprint identification is performed on the fingerprint signal through an algorithm.

Optionally, in an embodiment of the present application, the under-screen biometric identification apparatus 200 may further include a circuit board for transmitting a signal. For example, as shown in FIGS. 7 to 9, the circuit board may be a flexible printed circuit (FPC) 270.

The imaging chip 250 can be soldered to the FPC 270 through a pad, and achieve electrical interconnection and signal transmission with other peripheral circuits or other elements of the electronic device 100 as shown in FIG. 1 or FIG. 2 through the FPC 270. For example, the imaging chip 250 may receive a control signal of a processing unit of the electronic device 100 through the FPC 270, and may also output the biometric detection signal (e.g., a fingerprint image) to the processing unit, a control unit or the like of the electronic device 100 through the FPC 270.

Optionally, in an embodiment of the present application, the under-screen biometric identification apparatus 200 may further include a steel plate fixed on a lower surface of the flexible printed circuit.

Optionally, in an embodiment of the present application, as shown in FIGS. 7 to 9, the under-screen biometric identification apparatus 200 may further include an image processor 280 for receiving a biometric detection signal (e.g., a fingerprint image) sent from the FPC 270 and performing fingerprint identification based on the biometric detection signal.

Optionally, in an embodiment of the present application, as shown in FIG. 9, the imaging chip 250 is fixed on an upper surface of the FPC 270, and a lower surface of the support 230 is fixedly connected to the upper surface of the FPC 270 in an edge area of the imaging chip 250.

As shown in FIGS. 7 to 9, since the support 230 is fixed on the upper surface of the FPC 270, the support 230 and the FPC 270 can form a closed space. And influence on stability of the under-screen biometric identification apparatus 200 due to too large or too small pressure intensity in the closed space should be avoided.

Optionally, in an embodiment of the present application, as shown in FIGS. 7 to 9, the support 230 is provided with a vent hole 232 for adjusting an atmospheric pressure intensity of an internal space formed by the support 230 and the FPC 270.

In the embodiment of the present application, before reaching the imaging chip 250, an optical signal passing through the lens 210 may also be filtered by an optical filter to filter out unnecessary light.

Optionally, as shown in FIGS. 7 to 9, as an embodiment of the present application, the under-screen biometric identification apparatus 200 further includes an optical filter 260 which is disposed between the lens 210 and the imaging chip 250.

The filter 260 is used to reduce undesired background light in fingerprint sensing to improve optical sensing of received light by the imaging chip 250. The filter 260 may be specifically used to reject the environment light wavelengths, such as near IR and partial of the red light etc. For example, human fingers absorb most of the energy of the wavelengths under ~580 nm, if one or more optical filters or optical filtering coatings can be designed to reject light in wavelengths from 580 nm to infrared, undesired contributions to the optical detection in fingerprint sensing from the environment light may be greatly reduced.

Optionally, in an embodiment of the present application, the filter 260 may include one or more optical filters; the one or more optical filters can be configured, for example, as bandpass filters to allow transmission of the light emitted by the OLED pixels while blocking other light components such as the IR light in the sunlight. This optical filtering could be effective in reducing the background light caused by sunlight when using the under-screen biometric identification apparatus 200 outdoors. The one or more optical filters can be implemented as, for example, optical filter coatings formed on one or more continuous interfaces or one or more discrete interfaces. It should be understood that the filter 260 can be fabricated on a surface of any optical component or along an optical path to the imaging chip 250 from reflected light formed by reflection of a finger.

FIG. 9 merely takes an example that the filter 260 is located on an upper surface of the imaging chip 250, but the present application is not limited thereto. For example, the filter 260 may be attached to a bottom surface of a display, a surface of a prism, an interior of the imaging chip 250, or the like.

Figure 10:
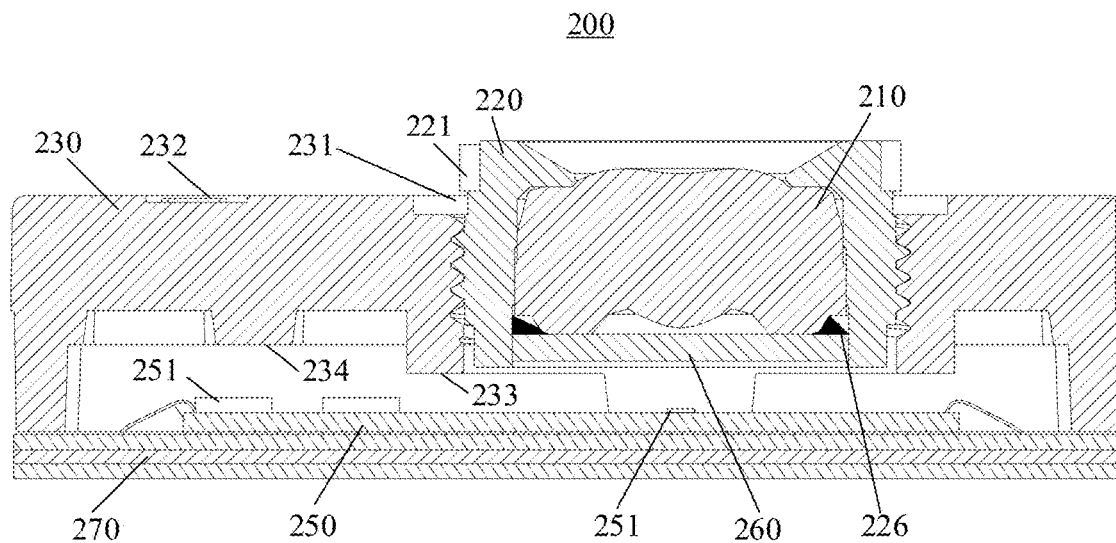
FIG. 10 is a schematic structural view of a filter in a lens barrel according to an embodiment of the present application.

FIG. 10 is a schematic structural view of a filter 260 provided in a lens barrel 220 according to an embodiment of the present application. As shown in FIG. 10, the filter 260 may be located in the lens barrel 220. In such a case, in order to increase stability of the filter 260 in the lens barrel 220, an edge area of a lower surface of the lens 210 may extend downward to form a convex ring structure 226, a lower surface of the convex ring structure 226 is in contact with the filter 260, and an outer side edge area of the convex ring structure 226 is fixedly connected to an upper surface of the filter 260 in an adhesive attaching and fixing method.

It should be understood that the number, position and specific structure of the filter 260 shown in FIG. 9 are merely exemplary descriptions, which is not limited in this embodiment of the present application. For example, whether to add one or more filters 260 may be determined according to actual needs of the imaging chip 250.

When the filter 260 can be located in the lens barrel 220, the under-screen biometric identification apparatus 200 further includes: a micro lens array fixed on an upper surface of the imaging chip 250, where the micro lens array is used for imaging an optical signal passing through the lens 210 to imaging pixel units of the imaging chip 250. Optionally, the micro lens array includes a plurality of hemispherical lenses or prisms distributed in an array, and since the hemispherical lenses or the prisms have a condensing effect, the amount of signal received on the imaging chip 250 could be increased by adding a micro lens array on the upper surface of the imaging chip 250.

In summary, the under-screen biometric identification apparatus 200 in the embodiment of the present application can be compatible with and adapt to a mechanical structure of the imaging chip 250 integrated with the micro lens array and the imaging chip 250 without the micro lens array, and is more flexible in structure.

Optionally, in an embodiment of the present application, each of the imaging pixel units of the imaging chip 250 corresponds to one micro lens of the micro lens array.

Optionally, in an embodiment of the present application, the micro lens in the micro lens array is a hemispherical lens, the imaging pixel unit is a polygon, and a diameter of the hemispherical lens is a length of a long side of the polygon.

Figure 11:
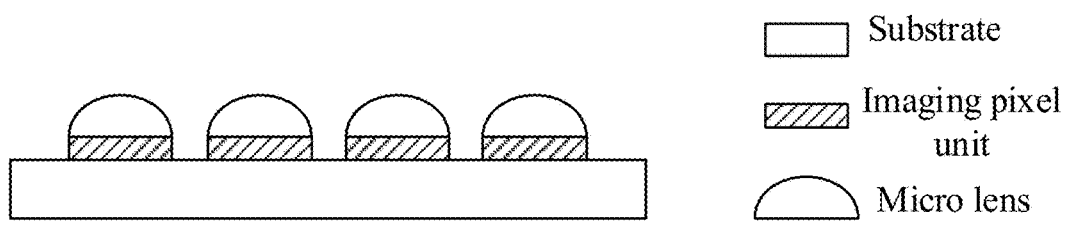
FIG. 11 is a schematic structural view of an imaging chip having a micro lens array according to an embodiment of the present application.

FIG. 11 is a schematic structural view of an imaging chip integrated with a micro lens array according to an embodiment of the present application. As shown in FIG. 11, when the imaging pixel unit is square, a diameter of the hemispherical lens is about a side length of the square. For example, both the side length of the imaging pixel unit and the diameter of the hemispherical lens are 5 um.

It should be noted that the hemispherical lens on the imaging chip 250 may have a thickness of 5 um, but a 5 um thick hemispherical lens cannot be shown in module drawings of a millimeter thickness. That is, the micro lens array 251 shown in FIG. 10 is merely an example, and the embodiment of the present application is not limited thereto.

In other words, dimensions such as the thicknesses, lengths and widths of various components in embodiments of the present application shown in the drawings, as well as dimensions of the overall thickness, length and width of an under-screen biometric identification apparatus are merely illustrative, and should not constitute any limitation to the present application.

In an embodiment of the present application, the under-screen biometric identification apparatus 200 is not in direct contact with the display screen, that is, the under-screen biometric identification apparatus 200 is designed to be separate from the display screen.

Optionally, in an embodiment of the present application, the support 230 in the under-screen biometric identification apparatus 200 is fixed under a display screen by a fixing support such that a distance between an upper surface of the display screen and an optical center of the lens 210 satisfies an imaging condition.

Optionally, in an embodiment of the present application, the imaging condition may be the following optical imaging formula:

$$1/u + 1/v = 1/f$$

In the formula, u denotes an object distance, v denotes an image distance, and f denotes a focal length. That is, the reciprocal of the object distance plus the reciprocal of the image distance is equal to the reciprocal of the focal length. In an embodiment of the present application, a distance between an upper surface of the display screen and an optical center of the lens 210 is an object distance, and a distance between the optical center of the lens 210 and an upper surface of the imaging chip 250 is an image distance, and a focal length of the lens 210 is a fixed value.

In other words, when the support 230 is fixed under a display screen by a fixing support, it requires distances among an upper surface of the display screen, an optical center of the lens 210 and an upper surface of the imaging chip 250 to satisfy the imaging condition.

Specifically, the distance between the optical center of the lens 210 and the upper surface of the imaging chip 250 is the imaging distance of the lens 210, the imaging distance of the lens 210 can be adjusted by an auto-focusing machine adjusting a height of the lens barrel 220. Since light received by the imaging chip 250 may contain a fingerprint signal and an internal structure signal of a screen, in the embodiment of the present application, a weak alternating condition can be further formed by adjusting a focus of the lens 210, so that imaging of the internal structure signal of the screen is blurred, while imaging of the fingerprint signal is not affected.

In other words, the image distance (i.e., the distance between the optical center of the lens 210 and the upper surface of the imaging chip 250) in the above formula can be revised. For example, a first imaging interface is offset by a distance to a second imaging interface, and a distance between the second imaging interface and the optical center of the lens 210 is defined as a revised value of the image distance, where the first imaging interface is the clearest interface for imaging a fingerprint signal, and the internal structure signal of the screen produces an impact on the imaging of the fingerprint signal, so that the fingerprint imaging cannot meet a requirement of fingerprint identification.

It should be understood that the first imaging interface may be offset toward a direction close to the optical center of the lens 210, or may be offset towards a direction away from the optical center of the lens 210, which is not limited in an embodiment of the present application. For example, the first imaging interface may be offset by a distance of ±10 um to ±50 um. It should be noted that the range is only an exemplary range of the gap, and the embodiment of the present application is not limited thereto.

Figure 12:
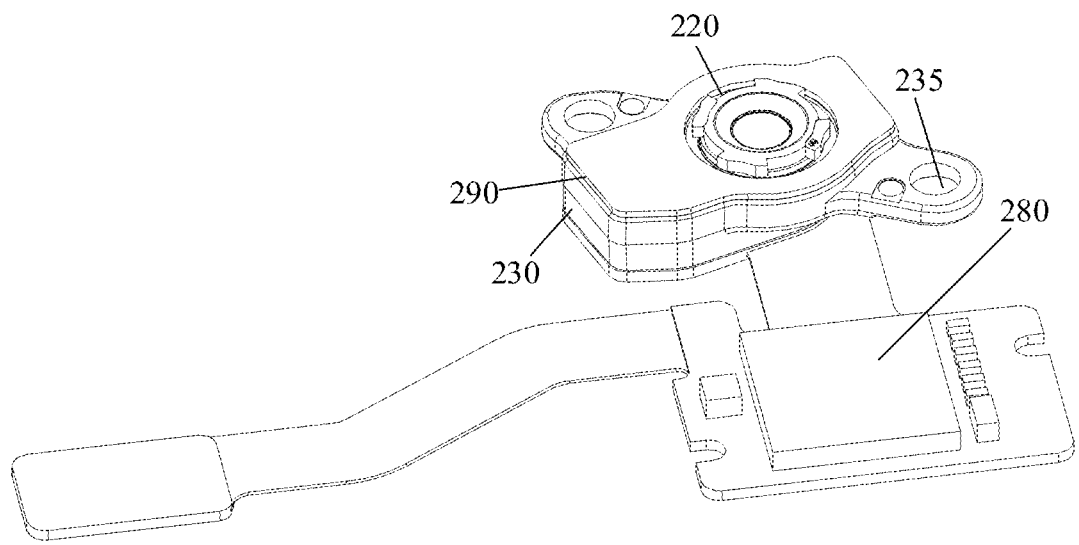
FIG. 12 is an oriented view of an upper surface of a support of an under-screen biometric identification apparatus attached with a foam according to an embodiment of the present application.

FIG. 12 is an oriented view of an upper surface of a support of an under-screen biometric identification apparatus attached with a foam according to an embodiment of the present application. As shown in FIG. 12, the under-screen biometric identification apparatus 200 may further include a foam 290 disposed on an upper surface of the support 230. The foam 290 can be used for dust seal.

In the embodiment of the present application, the under-screen biometric identification apparatus 200 may be mounted under the display screen by being fixedly connected to an easily disassembled device inside a terminal device.

In other words, the above-described easily disassembled device may serve as a fixing support between the under-screen biometric identification apparatus 200 and the display screen 320. The under-screen biometric identification apparatus 200 can be fixedly disposed under the display screen in a non-contact manner by other auxiliary elements. For example, the under-screen biometric identification apparatus 200 can be fixed to the fixing support, and fixedly disposed under the display screen 320 through the fixing support.

Optionally, in an embodiment of the present application, when the under-screen biometric identification apparatus is applied to a mobile terminal (such as a smart phone), the under-screen biometric identification apparatus 200 may be fixed under the display screen through a middle frame or other components of the mobile terminal.

FIGS. 13 to 18 are schematic views of the support 230 disposed under a display screen 320 through a middle frame 370. As shown in FIGS. 13 to 18, the under-screen biometric identification apparatus 200 can be fixedly disposed under the display screen 320. The display screen 320 may be the OLED display screen 120 as shown in FIG. 1 and FIG. 2, and the under-screen biometric identification apparatus 200 may be the under-screen biometric identification apparatus 140 as shown in FIG. 1 and FIG. 2, which may specifically include the lens 210, the lens barrel 220, the support 230, the imaging chip 250, the filter 260, the FPC 270, the foam 290, or the like. The under-screen biometric identification apparatus 200 may be used for capturing a fingerprint or other biometric characteristics, and a biometric capturing area is at least partially located in a display area of the display screen 320. As for specific structures, functions, and biometric detection and identification processes of the display screen 320 and the under-screen biometric identification apparatus 200, reference can be made to the previous description of the OLED display screen 120 and the under-screen biometric identification apparatus 140, which will not be repeated redundantly herein.

The middle frame 370 is a frame of an electronic device that is disposed between the display screen 320 and a back cover and used for carrying various components therein, and the various components therein include, but are not limited to, a battery, a main board, a camera, a flex cable, various sensors, a microphone, an earphone, or the like.

The middle frame 370 may be made of a metal or alloy material, or even made of a plastic material. In this case, the middle frame 370 may even be integrally formed with a bezel of a mobile terminal, which means that the inner middle frame and the bezel serve as a whole. For example, the bezel may be just a metal welt, or a metal-like coating may be applied to the middle frame. Further, the middle frame 370 may further be a composite middle frame, for example, including an inner middle frame and an outer middle frame; the inner middle frame is used for carrying parts of a mobile phone (such as the support 230), while the outer middle frame is located outside the inner middle frame; and an outer edge of the outer middle frame is equipped with a button of the mobile phone, and the inner middle frame is integrated with the outer middle frame.

Optionally, in an embodiment of the present application, there is a gap between the under-screen biometric identification apparatus 200 and the display screen 320.

It should be understood that there is a gap between the under-screen biometric identification apparatus 200 and the display screen 320 in order to enable the distance between the upper surface of the display screen and the optical center of the lens 210 to satisfy the imaging condition. The size and specific meaning of the gap are not limited in the embodiment of the present application.

For example, the gap may be determined by a manufacturer debugging in a process of mounting the biometric identification device 200, or may be specified by various manufacturers.

For another example, the gap may be the distance between the upper surface of the lens barrel 220 and the lower surface of the display screen 320, or may be the distance between the upper surface of the support 230 and the lower surface of the display screen 320.

Optionally, in an embodiment of the present application, a width of the gap between the under-screen biometric identification apparatus 200 and the display screen 320 may be greater than or equal to a first distance, and the first distance is a minimum distance that the lens barrel 220 does not touch the display screen 320 when a terminal device is in a shaking state such as a drop or a collision.

For example, the width of the gap may range from 0.3 mm to 1 mm. It should be noted that the range is only an exemplary range of the gap, and the embodiment of the present application is not limited thereto.

It should be understood that although the middle frame 370 being a fixing support is taken as an example in the above-mentioned embodiment, in other embodiments, the under-screen biometric identification apparatus 200 may be mounted under the display screen 320 by being fixedly connected to any easily disassembled device in a terminal device, while ensuring that there is a gap between the under-screen biometric identification apparatus 200 and the display screen 320, as long as the under-screen biometric identification apparatus 200 can be fixedly disposed under the display screen 320 in a non-contact manner. In other embodiments, the under-screen biometric identification apparatus 200 may also be fixed on an easily disassembled device such as a back cover, a main board, a battery, or the like of the mobile terminal, and is further fixedly disposed under the display screen 320.

Since the under-screen biometric identification apparatus 200 is disposed under the display screen 320 in a non-contact manner and is not in contact with the lower surface of the display screen 320, the under-screen biometric identification apparatus 200 is completely decoupled to the display screen 320, thereby avoiding damage to the display screen 320 when the under-screen biometric identification apparatus 200 is disassembled.

In addition, since the under-screen biometric identification apparatus 200 is not in contact with the lower surface of the display screen 320, a fixed gap is maintained therebetween, and the gap may be an air gap that is not filled with any auxiliary material, which could ensure that the under-screen biometric identification apparatus 200 does not touch the lower surface of the display 320 when the display screen 320 is pressed or the terminal device is dropped or collided, and stability and performance of biometric identification of the under-screen biometric identification apparatus 200 are not affected.

In summary, in an embodiment of the present application, the under-screen biometric identification apparatus 200 is designed to be separated from the lower surface of the display screen 320, which could reduce a difficulty of disassembling the under-screen biometric identification apparatus 200, and improves maintainability of a terminal device. Further, complexity of mounting the under-screen biometric identification apparatus 200 under the display screen 320 in a manufacturing process of the under-screen biometric identification apparatus 200 could be reduced, a manufacturing success rate of the under-screen biometric identification apparatus 200 could be improved, and further, production cost is reduced. Moreover, biometric identification stability and performance of the under-screen biometric identification apparatus 200 are not affected either.

Figure 13:
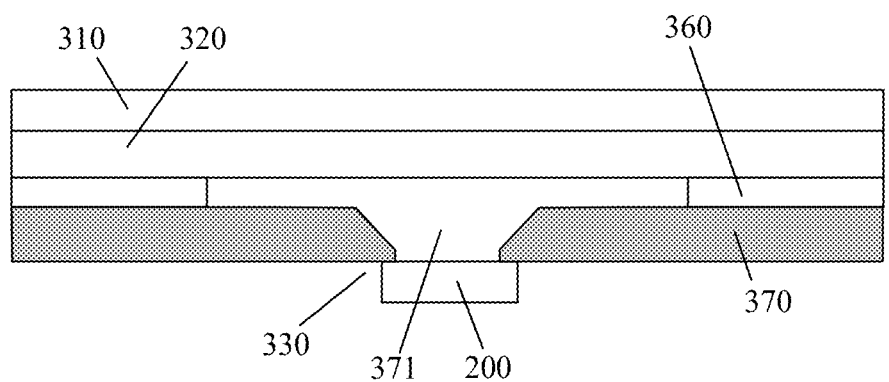
FIGS. 13 to 18 are schematic structural views of an under-screen biometric identification apparatus located under a display screen according to embodiments of the present application.
Figure 14:
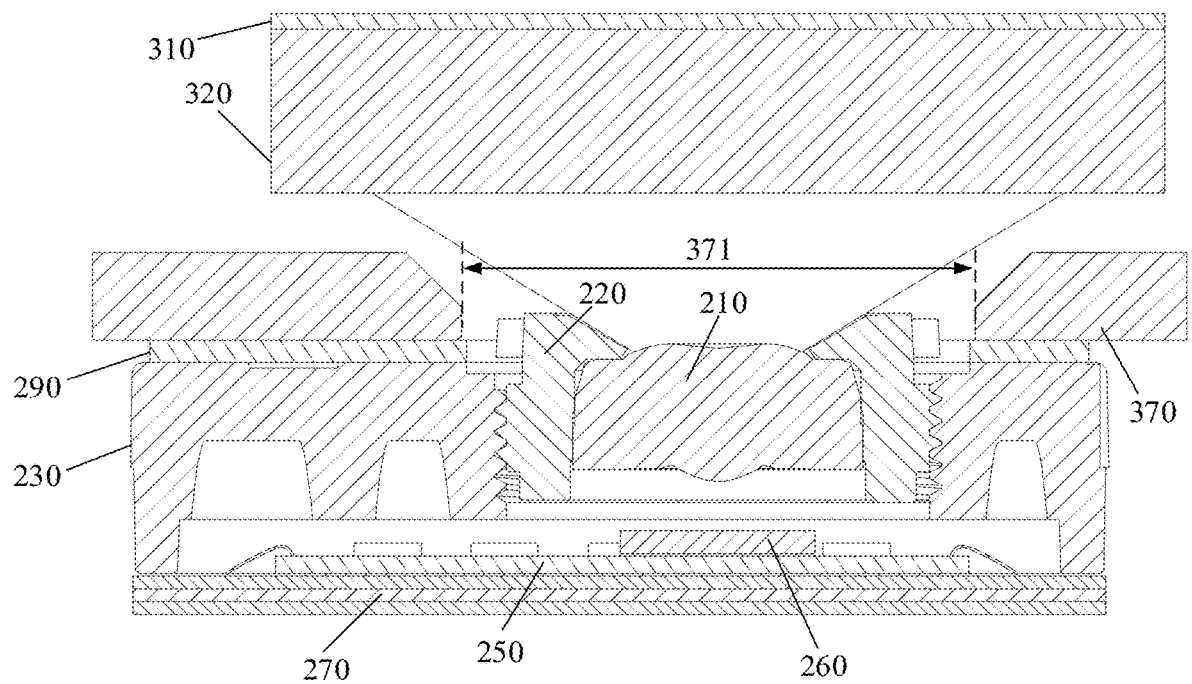
Figure 15:
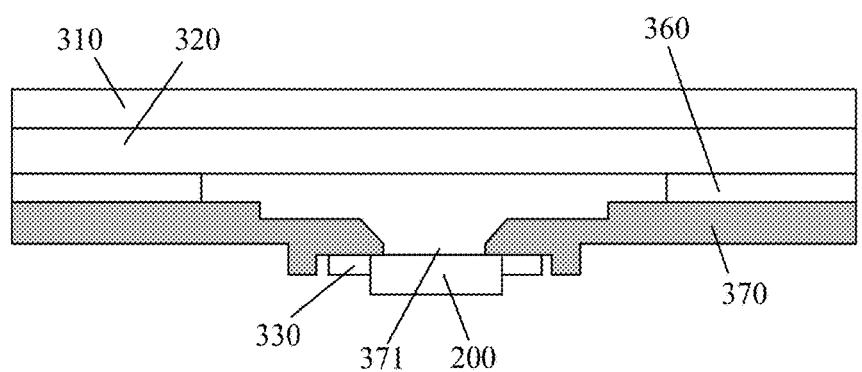

Optionally, in an embodiment of the present application, as shown in FIGS. 13 to 15, the foam 290 is disposed between an upper surface of the support 230 and a lower surface of the middle frame 370. The foam 290 can be not only used for dust seal, but also attaching the support 230 and the middle frame 370.

It should be noted that, in an embodiment of the present application, the positional relationship between the display screen 320 and the middle frame 370 is relatively fixed.

Optionally, in an embodiment of the present application, as shown in FIG. 13, an edge area of the upper surface of the middle frame 370 is attached to a lower surface of the display screen 320, and there is also a gap between an area of the upper surface of the middle frame 370 other than the edge area and the display screen 320.

The edge area of the upper surface of the middle frame 370 being attached to the lower surface of the display screen 320 can be understood as: the display screen 320 and the middle frame 370 are fixedly connected to each other by means of attaching the edge of the lower surface of the display screen 320 to the edge of the upper surface of the middle frame 370.

In an embodiment of the present application, if the under-screen biometric identification apparatus 200 optically performs biometric identification, for example, optical fingerprint identification, the under-screen biometric identification apparatus 200 needs to detect reflected light formed by reflection of a finger from an optical signal emitted by the display screen 320.

In an optional solution, as shown in FIG. 13, the middle frame 370 is provided with a hole 371 formed in a mounting area of the under-screen biometric identification apparatus 200, the under-screen biometric identification apparatus 200 is disposed under the hole 371, and an optical sensing array is disposed just opposite the lower surface of the display screen 320 through the hole 371. Therefore, when the under-screen biometric identification apparatus 200 is disposed on the lower surface of the middle frame 370, it could ensure that the under-screen biometric identification apparatus 200 can receive the above reflected light through the hole 371.

It should be understood that the size of the hole 371 is not specifically limited in the embodiment of the present application. For example, the size of the hole 371 of the middle frame 370 may be smaller than or equal to the size of the under-screen biometric identification apparatus 200. For another example, the size of the hole 371 of the middle frame 370 may also be greater than or equal to the size of the lens barrel 220.

Optionally, in an embodiment of the present application, as shown in FIG. 15, the size of the hole 371 of the middle frame 370 may be smaller than the size of the under-screen biometric identification apparatus 200.

Figure 16:
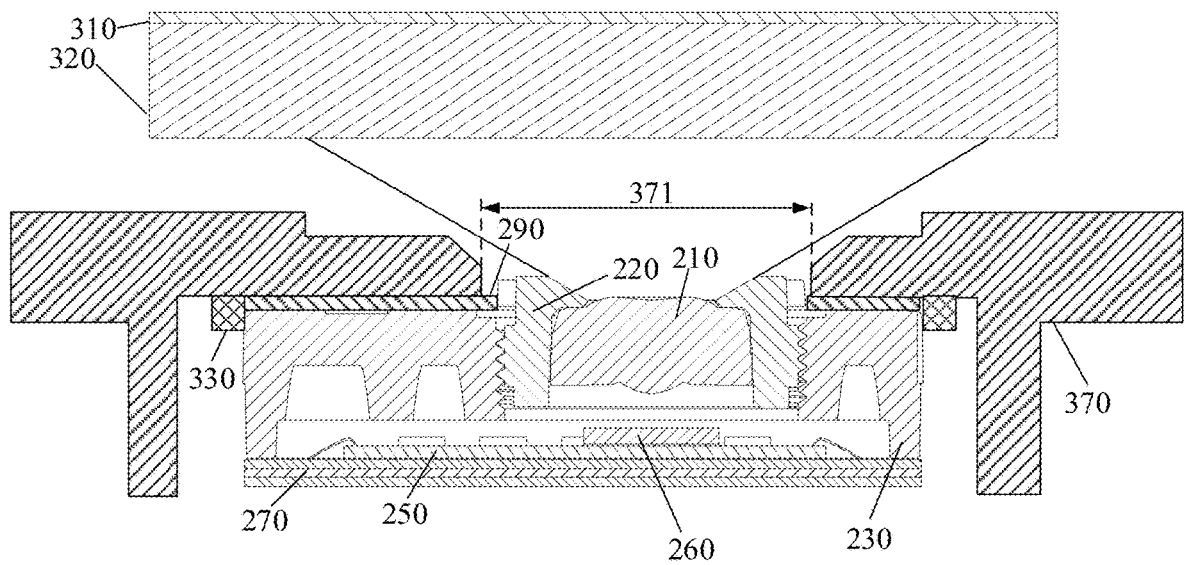

Optionally, in an embodiment of the present application, as shown in FIG. 16, the size of the hole 371 of the middle frame 370 is greater than the size of the lens barrel 220, and the size of the hole 371 of the middle frame 370 is smaller than the size of the under-screen biometric identification apparatus 200. In this case, the lens barrel 220 can be at least partially accommodated in the hole 371 of the middle frame 370, and a buffer space can be formed between the lens barrel 220 and the middle frame 370, which can ensure that the lens barrel 220 does not touch the middle frame 370 when the middle frame 370 is pressed or a terminal device is dropped or collided, and stability and performance of biometric identification of the under-screen biometric identification apparatus 200 are not affected either.

Figure 17:
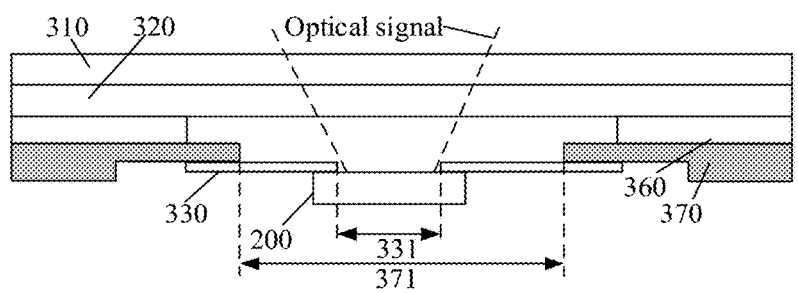
Figure 18:
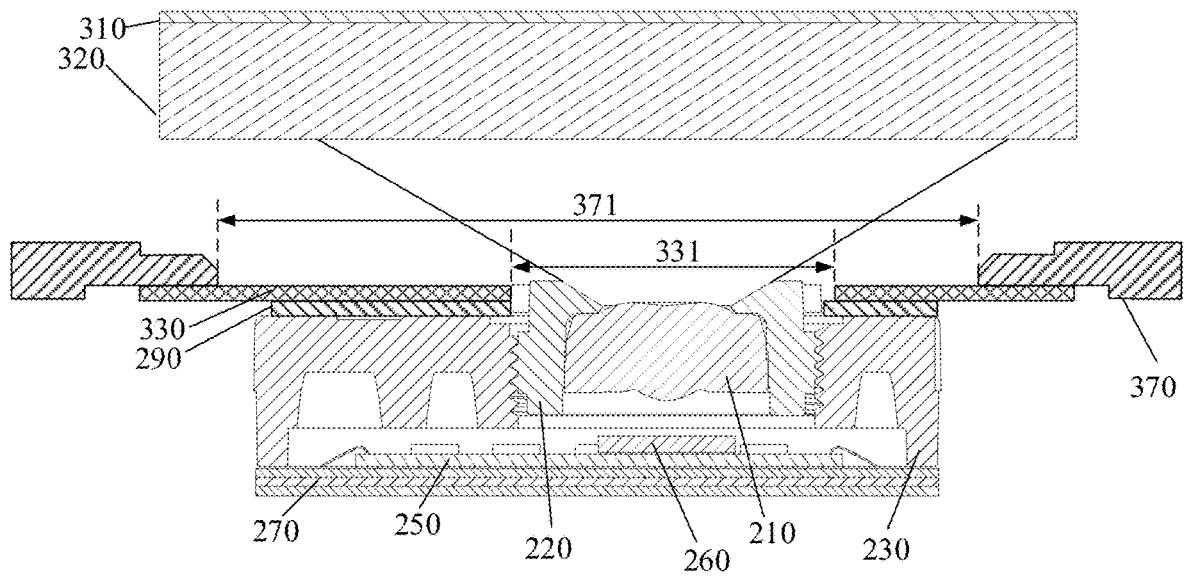

Optionally, in an embodiment of the present application, as shown in FIGS. 17 to 18, the size of the hole 371 of the middle frame 370 may be greater than the size of the under-screen biometric identification apparatus 200.

Optionally, in an embodiment of the present application, the under-screen biometric identification apparatus 200 may be directly fixed on the middle frame 370.

Optionally, in an embodiment of the present application, a side surface of the under-screen biometric identification apparatus 200 may be fixedly connected to a hole wall of the hole 371; or an edge of an upper surface of the under-screen biometric identification apparatus 200 may be fixedly connected to a lower surface of the middle frame 370 in an area located around the hole 371.

FIG. 13 and FIG. 14 are schematic structural views of the under-screen biometric identification apparatus 200 being directly fixedly connected to the middle frame 370. For example, as shown in FIG. 13, an edge of an upper surface of the under-screen biometric identification apparatus 200 may be fixedly connected to a lower surface of the middle frame 370 in an area located around the hole 371. More specifically, for example, as shown in FIG. 14, the upper surface of the support 230 is fixedly connected to an area of the lower surface of the middle frame 370 that is located around the hole 371.

In an embodiment of the present application, the manner in which the under-screen biometric identification apparatus 200 is fixedly connected to the middle frame 370 directly is merely an exemplary description, and the embodiment of the present application is not limited thereto. For example, in other alternative embodiments, the under-screen biometric identification apparatus 200 may also be fixedly connected to the middle frame 370 through a connector.

Optionally, in an embodiment of the present application, the under-screen biometric identification apparatus 200 may further include: a module support 330 which may serve as a connector between the support 230 and the middle frame 370 for implementing a fixed connection therebetween.

Optionally, in an embodiment of the present application, a side surface of the under-screen biometric identification apparatus 200 may be fixedly connected to an inner side surface of the module support 330, or an edge of an upper surface of the under-screen biometric identification apparatus 200 may be fixedly connected to a lower surface of the module support 330; whereas an outer side surface of the module support 330 is fixedly connected to a hole wall of the hole 371, or an upper surface of the module support 330 is fixedly connected to an area of the lower surface of the middle frame 370 that is located around the hole 371 (i.e., at a hole edge).

FIGS. 15 to 18 are schematic structural views of the under-screen biometric identification apparatus 200 being fixedly connected to the middle frame 370 through the module support 330.

Optionally, in an embodiment of the present application, as shown in FIG. 15, a side surface of the under-screen biometric identification apparatus 200 may be fixed to an inner side surface of the module support 330, and an edge of an upper surface of the under-screen biometric identification apparatus 200 and an upper surface of the module support 330 may be simultaneously fixed to an area of the lower surface of the middle frame 370 that is located around the hole 371 (i.e., at a hole edge).

Optionally, in an embodiment of the present application, as shown in FIG. 16, a side surface of the support 230 may be fixed to an inner side surface of the module support 330, and an edge of the upper surface of the support 230 and a upper surface of the module support 330 may be simultaneously fixed to an area of the lower surface of the middle frame 370 that is located around the hole 371 (i.e., at a hole edge).

Optionally, in an embodiment of the present application, as shown in FIGS. 16 and 17, the size of the hole 371 of the middle frame 370 may be greater than the size of the under-screen biometric identification apparatus 200, and the under-screen biometric identification apparatus 200 is fixed to the middle frame 370 through the module support 330.

Optionally, in an embodiment of the present application, as shown in FIG. 17, the edge of the upper surface of the under-screen biometric identification apparatus 200 is fixed to an area of the lower surface of the middle frame 370 that is located around the hole 371 (i.e., at a hole edge) through the module support 330.

Optionally, in an embodiment of the present application, as shown in FIG. 18, the edge of the upper surface of the support 230 is fixed to an area of the lower surface of the middle frame 370 that is located around the hole 371 (i.e., at a hole edge) through the module support 330.

With the design structure shown in FIG. 17 and FIG. 18, the upper surface of the module support 330 can be allowed to be higher than the upper surface of the under-screen biometric identification apparatus 200. On one hand, this ensures that there is a gap between the under-screen biometric identification apparatus 200 and the display screen 320. On the other hand, since the upper surface of the module support 330 can be higher than the upper surface of the under-screen biometric identification apparatus 200, the under-screen biometric identification apparatus 200 and at least one surface of the module support 330 can be fixedly connected, thereby increasing a contact area between the under-screen biometric identification apparatus 200 and the module support 330, and increasing stability of fixed connection when the under-screen biometric identification apparatus 200 is fixedly connected to the module support 330 in a double-sided adhesive fixing method or a glue fixing method.

It should be understood that a fixed connection involved in the embodiments of the present application includes, but is not limited to, the following connection methods: a screw fixing method, a double-sided adhesive fixing method, a glue fixing method, a welding and fixing method and a coupling and fixing method.

It should be understood that a main function of the module support 330 is to fixedly connect the under-screen biometric identification apparatus 200 to the middle frame 370, and allow for a gap between the under-screen biometric identification apparatus 200 and the display screen 320. The position and/or specific structure of the module support 330 shown in FIG. 14 are merely examples, and the embodiment of the present application is not limited thereto.

For example, in other embodiments, in order to increase stability of the fixing connection between the under-screen biometric identification apparatus 200 and the module support 330, the module support 330 may further be provided with a cavity structure, and the cavity structure is aligned with the hole 371 of the middle frame 370, which can provide an accommodation space for the under-screen biometric identification apparatus 200. In addition, the under-screen biometric identification apparatus 200 is at least partially accommodated and fixed in the cavity structure. For example, a side surface of the under-screen biometric identification apparatus 200 is fixedly connected to an inner side surface of the module support 330 through the cavity structure.

Further, in order to ensure certain stability of fixed connection of the under-screen biometric identification apparatus 200 and the module support 330 through the cavity structure, as an embodiment, a shape of the cavity structure may be a shape of the under-screen biometric identification apparatus 200. As another embodiment, the cavity structure may be further optimized. For example, a top edge of the cavity structure of the module support 330 may extend inward to form an annular fixing part, and an edge of an upper surface of the under-screen biometric identification apparatus 200 may be fixed to a lower surface of the annular fixing part, and an upper surface of the annular fixing part is flush with an upper surface of a main body of the module support 330. The annular fixing part of the module support 330 is utilized so that the connection between the under-screen biometric identification apparatus 200 and the module support 330 in the cavity structure can be more stable, and in this case, the upper surface of the module support 330 is higher than the upper surface of the under-screen biometric identification apparatus 200, and a height difference therebetween can further increase a width of the gap between the display screen 320 and the under-screen biometric identification apparatus 200.

In addition, the middle frame 370 of the terminal device may adopt a metal middle frame or an aluminum alloy middle frame, and a requirement for the width of the gap between the display screen 320 and the under-screen biometric identification apparatus 200 may not be satisfied due to a thinner or thicker thickness of the middle frame. Therefore, in order to ensure a sufficient width of the gap between the under-screen biometric identification apparatus 200 and the display screen 320 in the embodiment of the present application, in an embodiment of the present application, a structural design of the middle frame 370 can be further optimized. The structure of the middle frame 370 in embodiments of the present application will be exemplarily described below with reference to accompanying drawings.

In an actual product, if a thickness of the middle frame 370 is thinner, optionally, in an embodiment of the present application, thickening processing can be performed for a mounting area of the under-screen biometric identification apparatus 200 on the middle frame 370.

Optionally, in an embodiment of the present application, the middle frame 370 may be provided with the hole 371 formed at the above-mentioned mounting position, and an edge of the hole 371 of the middle frame 370 may further extend downward to form a fifth convex structure. The under-screen biometric identification apparatus 200 may be directly mounted or fixed to a lower surface of the fifth convex structure through the module support 330.

Optionally, in an embodiment of the present application, as shown in FIG. 15 and FIG. 16, the edge of the hole 371 of the middle frame 370 may further extend downward to form a convex ring, and the under-screen biometric identification apparatus 200 can be located at an inner side of the convex ring after being mounted to the middle frame 370. Further, as shown in FIG. 15 and FIG. 16, the under-screen biometric identification apparatus 200 may also be fixed in the convex ring through the module support 330. On one hand, the convex ring could ensure that the middle frame 370 still has higher strength after thinning the peripheral area of the hole 371, and on the other hand, the convex ring could also protect the under-screen biometric identification apparatus 200 at the inner side.

In an actual product, if a thickness of the middle frame 370 is thicker, optionally, in an embodiment of the present application, thinning processing can be performed for the mounting area of the under-screen biometric identification apparatus 200 on the middle frame 370.

Optionally, in an embodiment of the present application, the lower surface of the middle frame 370 may be provided with a groove structure formed in the periphery area of the hole 371. The under-screen biometric identification apparatus 200 may be directly mounted or fixed to the groove structure through the module support 330. For example, as shown in FIG. 17 and FIG. 18, the lower surface of the middle frame 370 extends upward at a hole edge facing away from the display screen 320 to form a groove structure, and the under-screen biometric identification apparatus 200 is fixed in the groove structure through the module support 320.

Optionally, in an embodiment of the present application, thinning processing can be performed on the upper surface of the middle frame 370 in the peripheral area of the hole 371. For example, as shown in FIG. 15 and FIG. 16, the upper surface of the middle frame 370 is provided with a third step structure formed in an edge area of the hole 371. That is, a thickness of the middle frame 370 in the peripheral area of the hole 371 is smaller than a thickness of a main body of the middle frame 370.

Optionally, in an embodiment of the present application, the height difference of the third step structure may also be used as a part of a gap between the display screen 320 and the under-screen biometric identification apparatus 200.

Optionally, in an embodiment of the present application, as shown in FIG. 18, an upper surface of the middle frame 370 is provided with a third step structure formed in an edge area of the hole 371, and a lower surface of the middle frame 370 may be provided with a groove structure formed in a peripheral area of the hole 371.

Optionally, in an embodiment of the present application, as shown in FIGS. 14 to 18, chamfering processing is performed on the hole edge of the hole 371 of the middle frame 370 toward the display screen 320 to form a bevel angle, which can be more favorable for reflected light to enter the under-screen biometric identification apparatus 200 from the hole 371 of the middle frame 370, thereby improving biometric detection performance and detection efficiency of the under-screen biometric identification apparatus.

Optionally, in an embodiment of the present application, the bevel angle extends to the hole edge on the lower surface of the middle frame facing away from the display screen, such that the gap includes a projection height of a plane where the bevel angle is located in a direction perpendicular to the display screen.

Optionally, in an embodiment of the present application, as shown in FIGS. 14 to 18, when applied to a terminal device, the under-screen biometric identification apparatus 200 may further include a cover 310.

The cover 310 may be a transparent protective cover, such as a glass cover or a sapphire cover, which may cover the display screen 120, and a lower surface of the cover 310 may be attached to an upper surface of the display screen 320 (i.e., a display plane). The display screen 320 and the cover 310 may be connected by an adhesive layer or may be connected in other connection methods, which is not limited in this embodiment of the present application.

Optionally, in an embodiment of the present application, as shown FIGS. 13, 15 and 17, an edge of a lower surface of the display screen 320 may be attached to an upper surface of the middle frame 370 through a foam gum 360. In this embodiment, except for providing attachment between the display screen 320 and the middle frame 370, the foam gum 360 may have a certain thickness; the thickness of the foam gum 360 may allow for having a certain thickness between the lower surface of the display screen 320 and the upper surface of the middle frame 370, and the thickness of the foam gum 360 may be a part of a gap between the display screen 320 and the entire upper surface of the lens barrel 220. For example, the predetermined gap comprises a gap between a lower surface of the foam gum 360 and the entire upper surface of the lens barrel 220. In other word, the edge of the lower surface of the display screen 320 arranged under the cover 310 is attached to the upper surface of the middle frame 370 through the foam gum 360, and the predetermined gap comprises a gap between the lower surface of the foam gum 360 and the entire upper surface of the lens barrel 220.

Through the foregoing analysis, it can be found that, in embodiments of the present application, the under-screen biometric identification apparatus 200 is designed to be separated from the display screen 320, for example, the under-screen biometric identification apparatus 200 can be fixed on the middle frame 370 or the back cover structure, so as to solve problems such as disassembling difficulty, easy damage to the display screen 320 and high bonding process difficulty that result from directly bonding the under-screen biometric identification apparatus 200 to the display screen 320 with respect to the current under-screen biometric identification apparatus.

In addition, in the embodiments of the present application, a gap is formed between the under-screen biometric identification apparatus 200 and the lower surface of the display screen 320, and the gap could ensure that the under-screen biometric identification apparatus 200 does not touch the lower surface of the display 320 when the display screen 320 is pressed or when the terminal device is dropped or collided, thereby avoiding damage to the display screen 320.

It should be understood that FIGS. 13 to 18 are only examples in which the under-screen biometric identification apparatus 200 is attached to the lower surface of the middle frame 370, and the embodiment of the present application is not limited thereto. For example, in other alternative embodiments, the under-screen biometric identification apparatus 200 may be disposed on the upper surface or interior of the middle frame 370, and maintain a gap having a predetermined width with the display screen 320. In a specific implementation, the upper surface of the middle frame 370 may be provided with a groove structure, the under-screen biometric identification apparatus 200 may be fixed in the groove structure, and the groove structure may be used to provide an accommodation space for the under-screen biometric identification apparatus 200.

In addition, alternatively, the under-screen biometric identification apparatus 200 shown in FIG. 17 and FIG. 18 may also be mounted inside the hole 331 of the module support 330, for example, an outer side surface of the under-screen biometric identification apparatus 200 may be fixed to the inner side surface of the hole 331. In other words, the embodiments of the present application do not limit connection manners between various components in the under-screen biometric identification apparatus 200 either.

In the embodiments of the present application, the under-screen biometric identification apparatus 200 may also be referred to as a biometric identification module. A photodetector array may also be referred to as a photosensor array that can transmit light from lens 220. For example, the photosensor array can employ an array of photodiodes through which an optical signal is converted into an electrical signal so that imaging can be performed based on the electrical signal.

In an embodiment of the present application, a biometric identification component is further provided, which may include an under-screen biometric identification apparatus and a module support; when applied to the under-screen biometric identification apparatus or terminal device as described above, the biometric identification component may be directly mounted to a middle frame or the fixing frame of the terminal device. However, when the biometric identification apparatus or the under-screen biometric identification apparatus of the terminal device is damaged, the damaged biometric identification component can be replaced, and therefore, maintenance of replacing the under-screen biometric identification apparatus and complexity of replacing the device could be further reduced, thereby avoiding damage to the display screen.

In an embodiment of the present application, an electronic device is further provided, which may include a display screen and the under-screen biometric identification apparatus in the foregoing embodiments of the present application, where the under-screen biometric identification apparatus is disposed under a display screen such that a distance between an upper surface of the display screen and an optical center of a lens in the under-screen biometric identification apparatus satisfies an imaging condition.

The electronic device can be any electronic device having a display screen, which implements under-screen biometric identification using a technical solution of an embodiment of the present application. The display screen may be an organic light emitting diode display screen comprising a plurality of organic light emitting diode light sources, where the under-screen biometric identification apparatus adopts at least a portion of the organic light emitting diode light sources as an excitation source for biometric identification.

It should be noted that specific examples in embodiments of the present application are just for helping those skilled in the art better understand the embodiments of the present application, rather than for limiting the scope of the present application.

It should also be noted that terms used in embodiments of the present application and the claims appended hereto are merely for the purpose of describing particular embodiments, and are not intended to limit the embodiments of the present application. For example, the use of a singular form of "a", "the" and "said" in the embodiment of the present application and the claims appended hereto are also intended to include a plural form, unless otherwise clearly indicated herein by context.

Those of ordinary skill in the art may be aware that, units of the examples described in the embodiments disclosed in this paper may be implemented by electronic hardware, computer software, or a combination of the two. To clearly illustrate interchangeability between the hardware and the software, the foregoing illustration has generally described composition and steps of the examples according to functions. Whether these functions are executed in hardware or software mode depends on a particular application and a design constraint condition of the technical solutions. Persons skilled in the art may use different methods to implement the described functions for every particular application, but it should not be considered that such implementation goes beyond the scope of the present application.

In the several embodiments provided in the present application, it should be understood that, the disclosed system and device may be implemented in other manners. For example, the foregoing described apparatus embodiments are merely exemplary. For example, division of the units is merely logical function division and there may be other division manners in practical implementation. For example, multiple units or components may be combined or integrated into another system, or some features may be ignored or not executed. In addition, the displayed or discussed mutual coupling or direct coupling or communication connection may be indirect coupling or communication connection through some interfaces, apparatuses or units, and may also be electrical, mechanical, or connection in other forms.

The units described as separate parts may or may not be physically separate, and parts displayed as units may or may not be physical units, may be located in one position, or may be distributed on multiple network units. Part of or all of the units here may be selected according to a practical need to achieve the objectives of the solutions of the embodiments of the present application.

In addition, functional units in the embodiments of the present application may be integrated into a processing unit, or each unit may exist alone physically, or two or more than two units may be integrated into one unit. The integrated unit may be implemented in a form of hardware, or may be implemented in a form of a software functional unit.

If being implemented in the form of a software functional unit and sold or used as a separate product, the integrated unit may be stored in a computer-readable storage medium. Based on such understanding, the nature of the technical solutions of the present application, or the part contributing to the prior art, or all of or part of the technical solutions may be implemented in a form of software product. The computer software product is stored in a storage medium and includes several instructions for instructing a computer device (which may be a personal computer, a server, or a network device, and the like) to execute all of or part of the steps of the method described in the embodiments of the present application. The storage medium includes: various media that may store program codes, such as a U-disk, a removable hard disk, a read-only memory (ROM, Read-Only Memory), a random access memory (RAM, Random Access Memory), a magnetic disk, a compact disk, and so on.

The foregoing description is only a specific implementation manner of the present application. The protection scope of the present application, however, is not limited thereto. Various modifications or replacements may be readily conceivable to any person skilled in the art within the technical scope disclosed in the present application, and such modifications or replacements shall fall within the protection scope of the present application. Therefore, the protection scope of the present application shall be subject to the protection scope of the claims.

What is claimed is:

1. An under-screen biometric identification apparatus, applicable to an electronic device having a display screen, comprising:
    a lens barrel having at least one lens unit received therein and structured to be arranged under a display screen of the electronic device without contacting the display screen, the lens unit being configured for receiving an optical signal that is generated when a human finger on the display screen is illuminated and transmitted through the display screen;
    a holder for holding the lens barrel, the holder being engaged to the lens barrel through a focusing thread, the focusing thread is used to adjust a distance between the lens barrel and the display screen; and
    an imaging chip having a size greater than the lens barrel, the imaging chip comprising an optical sensing array and being configured for implementing optical imaging based on the optical signal passing through the lens unit to obtain a biometric pattern;
    wherein the holder is arranged in such a manner that a predetermined gap exists between the display screen and the lens barrel, the holder provides an accommodating space under the lens barrel, the imaging chip is received in the accommodating space and out of the lens barrel, wherein the optical sensing array of the imaging chip is arranged under the lens unit of the lens barrel to receive the optical signal passing through the lens unit;
    wherein the under-screen biometric identification apparatus further comprises:
    a flexible printed circuit, wherein the imaging chip is electrically fixed on an upper surface of the flexible printed circuit, and a lower surface of the holder is fixedly connected to the upper surface of the flexible printed circuit; wherein the holder is provided with a vent hole for adjusting an atmospheric pressure intensity of an internal space formed by the holder and the flexible printed circuit.

2. The under-screen biometric identification apparatus according to claim 1, wherein the holder is structured to be fixed to a lower surface of a middle frame of the electronic device, the middle frame is provided with a hole aligned with the lens barrel.

3. The under-screen biometric identification apparatus according to claim 2, wherein the lens barrel is at least partially arranged in the hole of the middle frame, and a gap exists between an outer side of the lens barrel and an inner side of the hole.

4. The under-screen biometric identification apparatus according to claim 2, wherein the holder is structured to be fixed onto the lower surface of the middle frame at a peripheral area around the hole.

5. The under-screen biometric identification apparatus according to claim 3, further comprising a foam, wherein the foam is arranged between an upper surface of the holder and a lower surface of the middle frame.

6. The under-screen biometric identification apparatus according to claim 3, wherein the holder comprises a pair of fixing ears, the pair of fixing ears extends from two opposite side of the holder and is configured for fixing the holder to the lower surface of the middle frame.

7. The under-screen biometric identification apparatus according to claim 1, wherein the holder comprises a glue dispensing structure, wherein the glue dispensing structure comprises a concave groove formed around the lens barrel for providing an accommodation space for glue.

8. The under-screen biometric identification apparatus according to claim 7, wherein the glue dispensing structure is an annular step structure comprising a step surface being parallel to an upper surface of the holder and communicated with a threaded hole of the holder, and a vertical surface connected between the upper surface of the holder and the step surface.

9. The under-screen biometric identification apparatus according to claim 8, wherein a width of the step surface is greater than a thread depth of the threaded hole of the holder.

10. The under-screen biometric identification apparatus according to claim 1, further comprising an optical filter, wherein the optical filter is located between the lens unit and the imaging chip and covers the optical sensing array, and comprises filtering coating layer formed on one or more continuous or discrete interfaces; the optical filter is configured to filter interference light from the optical signal, wherein the interference light comprises near IR light and partial of red light.

11. The under-screen biometric identification apparatus according to claim 10, wherein an edge area of a lower surface of the lens extends downward to form a convex ring structure, and a lower surface of the convex ring structure is in contact with and fixed to the optical filter.

12. The under-screen biometric identification apparatus according to claim 1, further comprising a micro lens array on an upper surface of the imaging chip, wherein the micro lens array comprises a plurality of pixel-scale micro lenses, each micro lens is formed on a pixel unit of the imaging chip respectively, is used for converging the optical signal to a corresponding pixel unit.

13. The under-screen biometric identification apparatus according to claim 1, wherein the predetermined gap between the display screen and the lens unit is in a range from 0.3 mm to 1 mm, and the lens unit comprises an aspherical lens group cooperatively formed a macro lens with a focal length being in a range from 0.5 mm to 1.8 mm.

14. An electronic device, comprising:
   a display screen; and
   a biometric identification apparatus arranged under the display screen, wherein a biometric acquisition area of the biometric identification apparatus is at least partially located in a display area of the display screen, wherein the biometric identification apparatus comprises:
      a lens barrel having at least one lens unit received therein and structured to be arranged under a display screen of the electronic device without contacting the display screen, the lens unit being configured for receiving an optical signal that is generated when a human finger on the display screen is illuminated and transmitted through the display screen;
      a holder for holding the lens barrel, the holder being engaged to the lens barrel through a focusing thread, the focusing thread is used to adjust a distance between the lens barrel and the display screen; and
      an imaging chip having a size greater than the lens barrel, the imaging chip comprising an optical sensing array and being configured for implementing optical imaging based on the optical signal passing through the lens unit to obtain a biometric pattern;
      wherein the holder is fixed to a lower surface of a middle frame of the electronic device in such a manner that a predetermined gap exists between the display screen and the lens barrel, the holder provides an accommodating space under the lens barrel, the imaging chip is received in the accommodating space and out of the lens barrel, wherein the optical sensing array of the imaging chip is arranged under the lens unit of the lens barrel to receive the optical signal passing through the lens unit;
      wherein the biometric identification apparatus further comprises:
      a flexible printed circuit, wherein the imaging chip is electrically fixed on an upper surface of the flexible printed circuit, and a lower surface of the holder is fixedly connected to the upper surface of the flexible printed circuit; wherein the holder is provided with a vent hole for adjusting an atmospheric pressure intensity of an internal space formed by the holder and the flexible printed circuit.

15. The electronic device according to claim 14, wherein the middle frame is provided with a hole aligned with the lens barrel, the lens barrel is at least partially arranged in the hole of the middle frame, and a gap exists between an outer side of the lens barrel and an inner side of the hole.

16. The electronic device according to claim 15, wherein the holder is fixed to on a lower surface of the middle frame at a peripheral area around the hole, the holder comprises a pair of fixing ears, the pair of fixing ears extends from two opposite side of the holder and is configured for fixing the holder to the lower surface of the middle frame.

17. The electronic device according to claim 15, wherein the biometric identification apparatus further comprises a foam, wherein the foam is arranged between an upper surface of the holder and a lower surface of the middle frame.

18. The electronic device according to claim 14, wherein the predetermined gap between the display screen and the lens unit is in a range from 0.3 mm to 1 mm, and the lens unit comprises an aspherical lens group cooperatively formed a macro lens with a focal length being in a range from 0.5 mm to 1.8 mm.

19. An under-screen biometric identification apparatus, applicable to an electronic device having a display screen, comprising:
   a lens barrel having a lens unit arranged therein and structured to be arranged under a display screen, the lens unit being configured for receiving an optical signal that is generated when a human finger on the display screen is illuminated and transmitted through the display screen;
   a holder for holding the lens barrel and being engaged to the lens barrel, wherein the holder is structured to be fixed to a lower surface of a middle frame of the electronic device, such that the holder and the lens barrel are distanced from the display screen to maintain a predetermined gap between the display screen and the lens barrel; and
   an imaging chip arranged under the lens barrel and being accommodated in the holder, the imaging chip has a size greater than the lens barrel and is arranged out of the lens barrel, the imaging chip being configured for implementing optical imaging based on the optical signal passing through the lens unit to obtain a biometric pattern;
   wherein the under-screen biometric identification apparatus further comprises:
   a flexible printed circuit, wherein the imaging chip is electrically fixed on an upper surface of the flexible printed circuit, and a lower surface of the holder is fixedly connected to the upper surface of the flexible printed circuit; wherein the holder is provided with a vent hole for adjusting an atmospheric pressure intensity of an internal space formed by the holder and the flexible printed circuit.

* * * * *